(12) United States Patent
Baker et al.

(10) Patent No.: US 6,544,316 B2
(45) Date of Patent: Apr. 8, 2003

(54) HYDROGEN GAS SEPARATION USING ORGANIC-VAPOR-RESISTANT MEMBRANES

(75) Inventors: Richard W. Baker, Palo Alto, CA (US); Ingo Pinnau, Palo Alto, CA (US); Zhenjie He, Fremont, CA (US); Karl D. Amo, Mountain View, CA (US); Andre R. Da Costa, Menlo Park, CA (US); Ramin Daniels, San Jose, CA (US)

(73) Assignee: Membrane Technology and Research, Inc., Menlo Park, CA (US)

( * ) Notice: Subject to any disclaimer, the term of this patent is extended or adjusted under 35 U.S.C. 154(b) by 0 days.

(21) Appl. No.: 10/033,211

(22) Filed: Dec. 28, 2001

(65) Prior Publication Data

US 2002/0104435 A1 Aug. 8, 2002

Related U.S. Application Data

(63) Continuation-in-part of application No. 09/574,420, filed on May 19, 2000, now Pat. No. 6,361,583, and a continuation-in-part of application No. 09/574,303, filed on May 19, 2000, now Pat. No. 6,361,582.

(51) Int. Cl.[7] ............................................. B01D 53/22

(52) U.S. Cl. ...................... 95/55; 95/96; 96/13; 96/14

(58) Field of Search .............................. 95/45, 47–55, 95/96–106; 96/4, 8, 10, 13, 14, 108, 130

(56) References Cited

U.S. PATENT DOCUMENTS

| | | | |
|---|---|---|---|
| 3,133,132 A | 5/1964 | Loeb et al. | 264/49 |
| 3,246,450 A * | 4/1966 | Stern et al. | 95/55 |
| 3,308,107 A | 3/1967 | Selman et al. | 260/87.5 |
| 3,488,335 A | 1/1970 | Braun | 260/88.3 |
| 3,651,618 A * | 3/1972 | Klein et al. | 95/45 X |
| 3,798,185 A | 3/1974 | Skiens et al. | 260/2.5 |
| 3,865,845 A | 2/1975 | Resnick | 260/340.9 |
| 4,230,463 A | 10/1980 | Henis et al. | 55/16 |
| 4,243,701 A | 1/1981 | Riley et al. | 427/244 |
| 4,398,926 A * | 8/1983 | Doshi | 95/55 |
| 4,399,264 A | 8/1983 | Squire | 526/247 |
| 4,431,786 A | 2/1984 | Squire | 526/247 |

(List continued on next page.)

FOREIGN PATENT DOCUMENTS

EP 0649676 4/1995

OTHER PUBLICATIONS

I. Pinnau et al., "Gas and Vapor Transport Properties of Amorphous Perfluorinated Copolymer Membranes . . . " J. Membrane Science, 109, p. 125–133 (1996).

A. Alentiev et al., "High transport Parameters and Free Volume of Perfluorodioxole Copolymers," J. Membrane Science, 126, p. 123–132 (1997).

V. Arcella et al., "A Study on a Perfluoropolymer Purification and Its Application to Membrane Formation," J. Membrane Science, 163, p. 203–209 (1999).

J. Henis, "Chapter 10—Commercial and Practical Aspects of Gas Separation Membranes," in *Polymeric Gas Separation Membranes*, Paul and Yampol'skii (eds.), CRC Press (1994).

S. Ando et al., "Perfluorinated Polymers for Optical Waveguides," Chemtech, Dec. 1994, p. 20–27.

*Primary Examiner*—Robert H. Spitzer
(74) *Attorney, Agent, or Firm*—J. Farrant

(57) ABSTRACT

A process for separating hydrogen from a multicomponent gas mixture containing hydrogen and a hydrocarbon, using gas-separation membranes selective for hydrogen over the hydrocarbon. The membranes use a selective layer made from a polymer having repeating units of a fluorinated polymer, and demonstrate good resistance to plasticization by the organic components in the gas mixture under treatment, and good recovery after exposure to liquid aromatic hydrocarbons.

65 Claims, 10 Drawing Sheets

U.S. PATENT DOCUMENTS

| | | | | |
|---|---|---|---|---|
| 4,548,619 A | * | 10/1985 | Steacy | 95/55 |
| 4,565,855 A | | 1/1986 | Anderson et al. | 526/247 |
| 4,594,399 A | | 6/1986 | Anderson et al. | 526/247 |
| 4,654,063 A | * | 3/1987 | Auvil et al. | 95/55 X |
| 4,690,695 A | * | 9/1987 | Doshi | 95/55 |
| 4,754,009 A | | 6/1988 | Squire | 526/247 |
| 4,863,761 A | | 9/1989 | Puri | 427/175 |
| 4,880,442 A | * | 11/1989 | Hayes | 55/16 |
| 4,892,564 A | * | 1/1990 | Cooley | 95/55 |
| 4,897,457 A | | 1/1990 | Nakamura et al. | 526/247 |
| 4,910,276 A | | 3/1990 | Nakamura et al. | 526/247 |
| 5,021,602 A | | 6/1991 | Clement et al. | 558/230 |
| 5,051,113 A | * | 9/1991 | Nemser | 95/54 |
| 5,051,114 A | | 9/1991 | Nemser et al. | 55/16 |
| 5,053,059 A | * | 10/1991 | Nemser | 95/54 |
| 5,117,272 A | | 5/1992 | Nomura et al. | 357/52 |
| 5,141,642 A | | 8/1992 | Kusuki et al. | 210/490 |
| 5,147,417 A | * | 9/1992 | Nemser | 95/54 |
| 5,156,888 A | | 10/1992 | Haubs et al. | 427/163 |
| 5,242,636 A | | 9/1993 | Sluma et al. | 264/45.8 |
| 5,268,411 A | | 12/1993 | Yokotsuka et al. | 524/462 |
| 5,286,280 A | * | 2/1994 | Chiou | 95/51 X |
| 5,288,304 A | * | 2/1994 | Koros et al. | 95/54 X |
| 5,318,417 A | | 6/1994 | Kopp et al. | 425/97 |
| 5,407,466 A | * | 4/1995 | Lokhandwala et al. | 95/49 |
| 5,498,682 A | | 3/1996 | Navarrini et al. | 526/247 |
| 5,507,860 A | * | 4/1996 | Rao et al. | 95/55 X |
| 5,510,406 A | | 4/1996 | Matsuo et al. | 524/237 |
| 5,669,958 A | * | 9/1997 | Baker et al. | 95/50 |
| 5,688,307 A | * | 11/1997 | Pinnau et al. | 95/50 |
| 5,710,345 A | * | 1/1998 | Navarrini et al. | 568/596 |
| 5,772,733 A | * | 6/1998 | Lokhandwala et al. | 95/50 X |
| 5,779,763 A | * | 7/1998 | Pinnau et al. | 95/55 X |
| 5,883,177 A | | 3/1999 | Colaianna et al. | 524/462 |
| 5,962,612 A | | 10/1999 | Takakura et al. | 526/249 |
| 6,011,192 A | | 1/2000 | Baker et al. | 585/818 |
| 6,040,419 A | | 3/2000 | Drysdale et al. | 528/408 |
| 6,053,965 A | * | 4/2000 | Lokhandwala | 95/50 X |
| 6,128,919 A | * | 10/2000 | Daus et al. | 95/51 X |
| 6,161,386 A | * | 12/2000 | Lokhandwala | 95/50 X |
| 6,361,582 B1 | * | 3/2002 | Pinnau et al. | 95/45 |
| 6,361,583 B1 | * | 3/2002 | Pinnau et al. | 95/45 |

* cited by examiner

HYDROGEN GAS SEPARATION USING ORGANIC-VAPOR-RESISTANT MEMBRANES

This application is a continuation-in-part of Ser. No. 09/574,420, filed May 19, 2000 now U.S. Pat. No. 6,361,583, and Ser. No. 09/574,303 filed May 19, 2000, now U.S. Pat. No. 6,361,582, both of which are incorporated herein by reference in their entirety.

FIELD OF THE INVENTION

The invention relates to the separation of gases from hydrocarbon gas mixtures. In particular, the invention relates to the separation of hydrogen from hydrocarbons. The separation is carried out using hydrocarbon-resistant membranes, and is useful in refineries, petrochemical plants, and the like.

BACKGROUND OF THE INVENTION

Polymeric gas-separation membranes are well known and are in use in such areas as production of oxygen-enriched air, production of nitrogen from air, separation of carbon dioxide from methane, hydrogen recovery from various gas mixtures and removal of organic vapors from air or nitrogen.

The preferred membrane for use in any gas-separation application combines high selectivity with high flux. Thus, the membrane-making industry has engaged in an ongoing quest for polymers and membranes with improved selectivity/flux performance. Many polymeric materials are known that offer intrinsically attractive properties. That is, when the permeation performance of a small film of the material is measured under laboratory conditions, using pure gas samples and operating at modest temperature and pressure conditions, the film exhibits high permeability for some pure gases and low permeability for others, suggesting useful separation capability.

Unfortunately, gas separation in an industrial plant is seldom so simple. The gas mixtures to which the separation membranes are exposed may be hot, contaminated with solid or liquid particles, or at high pressure, may fluctuate in composition or flow rate or, more likely, may exhibit several of these features. Even in the most straightforward situation possible, where the gas stream to be separated is a two-component mix, uncontaminated by other components, at ambient temperature and moderate pressure, one component may interact with the membrane in such a way as to change the permeation characteristics of the other component, so that the separation factor or selectivity suggested by the pure gas measurements cannot be achieved. In gas mixtures that contain condensable components, it is frequently, although not always, the case that the mixed gas selectivity is lower, and at times considerably lower, than the ideal selectivity. The condensable component, which is readily sorbed into the polymer matrix, swells or, in the case of a glassy polymer, plasticizes the membrane, thereby reducing its selective capabilities. A technique for predicting mixed gas performance under real conditions from pure gas measurements with any reliability has not yet been developed.

A good example of these performance problems is the separation of hydrogen from mixtures containing hydrogen, methane and other hydrocarbons. Increasing reliance on low-hydrogen, high-sulfur crudes, coupled with tighter environmental regulations, has raised hydrogen demand in refineries. This is primarily due to increased hydrodesulfurization and hydrocracking; as a result many refineries are now out of balance with respect to hydrogen supply. At the same time, large quantities of hydrogen-containing off-gas from refinery processes are currently rejected to the refinery's fuel gas systems. Besides being a potential source of hydrogen, these off-gases contain hydrocarbons of value, for example, as liquefied petroleum gas (LPG) and chemical feedstocks.

The principal technologies available to recover hydrogen from these off-gases are cryogenic separation, pressure swing adsorption (PSA), and membrane separation. Membrane gas separation, the newest, is based on the difference in permeation rates of gas components through a selective membrane. Many membrane materials are much more permeable to hydrogen than to other gases and vapors. One of the first applications of gas separation membranes was recovery of hydrogen from ammonia plant purge streams, which contain hydrogen and nitrogen. This is an ideal application for membrane technology, because the membrane selectivity is high, and the feed gas is clean (free of contaminants, such as heavier hydrocarbons). Another successful application is to adjust hydrogen/carbon monoxide or hydrogen/methane ratios for synthesis gas production. Again, the feed gas is free of heavy hydrocarbon compounds.

Application of membranes to refinery separation operations has been much less successful. Refinery gas streams contain contaminants such as water vapor, acid gases, olefins, aromatics, and other organics. At relatively low concentrations, these contaminants cause membrane plasticization and loss of selectivity. At higher concentrations they can condense on the membrane and cause irreversible damage to it. When a feedstream containing such components and hydrogen is introduced into a membrane system, the hydrogen is removed from the feed gas into the permeate and the gas remaining on the feed side becomes progressively enriched in hydrocarbons, raising the dewpoint. For example, if the total hydrocarbon content increases from 60% in the feed gas to 85% in the residue gas, the dewpoint may increase by as much as 25° C. or more, depending on the hydrocarbon mix. Maintaining this hydrocarbon-rich mixture as gas may require it to be maintained at high temperature, such as 60° C., 70° C., 80° C. or even higher, which is costly and may itself eventually adversely affect the mechanical integrity of the membrane. Failure to do this means the hydrocarbon stream may enter the liquid-phase region of the phase diagram before it leaves the membrane module, and condense on the membrane surface, damaging it beyond recovery. Even if the hydrocarbons are kept in the gas phase, separation performance may fall away completely in the presence of hydrocarbon-rich mixtures.

These issues are discussed, for example, in J. M. S. Henis, "Commercial and Practical Aspects of Gas Separation Membranes" Chapter 10 of D. R. Paul and Y. P. Yampol'skii, *Polymeric Gas Separation Membranes*, CRC Press, Boca Raton, 1994. This reference gives upper limits on various contaminants in streams to be treated by polysulfone membranes of 50 psi hydrogen sulfide, 5 psi ammonia, 10% saturation of aromatics, 25% saturation of olefins and 11° C. above paraffin dewpoint (pages 473–474).

A great deal of research has been performed on improved membrane materials for hydrogen separation. A number of these materials appear to have significantly better properties than the original cellulose acetate or polysulfone membranes. For example, modern polyimide membranes have been reported with selectivity for hydrogen over methane of 50 to 200, as in U.S. Pat. Nos. 4,880,442 and 5,141,642. Unfortunately, these materials appear to remain susceptible to severe loss of performance through plasticization and to catastrophic collapse if contacted by liquid hydrocarbons.

Several failures have been reported in refinery applications where these conditions occur. This low process reliability has caused a number of process operators to discontinue applications of membrane separation for hydrogen recovery.

Thus, the need remains for membranes that will provide and maintain adequate performance under the conditions of exposure to gas mixtures, and particularly those containing $C_{3+}$ hydrocarbons, that are commonplace in refineries, chemical plants, or gas fields.

Films or membranes made from fluorinated polymers having a ring structure in the repeat unit are known. For example:

1. U.S. Pat. Nos. 4,897,457 and 4,910,276, both to Asahi Glass, disclose various perfluorinated polymers having repeating units of perfluorinated cyclic ethers, and cite the gas-permeation properties of certain of these, as in column 8, lines 48–60 of 4,910,276.
2. A paper entitled "A study on perfluoropolymer purification and its application to membrane formation" (V. Arcella et al., *Journal of Membrane Science*, Vol. 163, pages 203–209 (1999)) discusses the properties of membranes made from a copolymer of tetrafluoroethylene and a dioxole. Gas permeation data for various gases are cited.
3. European Patent Application 0 649 676 A1, to L'Air Liquide, discloses post-treatment of gas separation membranes by applying a layer of fluoropolymer, such as a perfluorinated dioxole, to seal holes or other defects in the membrane surface.
4. U.S. Pat. No. 5,051,114, to Du Pont, discloses gas separation methods using perfluoro-2,2-dimethyl-1,3-dioxole polymer membranes. This patent also discloses comparative data for membranes made from perfluoro(2-methylene-4-methyl-1,3-dioxolane) polymer (Example XI).
5. A paper entitled "Gas and vapor transport properties of amorphous perfluorinated copolymer membranes based on 2,2-bistrifluoromethyl-4,5-difluoro-1,3-dioxole/tetrafluoroethylene" (I. Pinnau et al., *Journal of Membrane Science*, Vol. 109, pages 125–133 (1996)) discusses the free volume and gas permeation properties of fluorinated dioxole/tetrafluoroethylene copolymers compared with substituted acetylene polymers. This reference also shows the susceptibility of this dioxole polymer to plasticization by organic vapors and the loss of selectivity as vapor partial pressure in a gas mixture increases (FIGS. 3 and 4).

Most of the data reported in the prior art references listed above are for permanent gases, carbon dioxide and methane, and refer only to measurements made with pure gases. The data reported in item 5 indicate that even these fluorinated polymers, which are characterized by their chemical inertness, appear to be similar to conventional hydrogen-separating membranes in their inability to withstand exposure to propane and heavier hydrocarbons.

SUMMARY OF THE INVENTION

The invention is a process for separating hydrogen from a gaseous hydrocarbon in a gas mixture. Such a mixture might typically, but not necessarily, be found as a process or waste stream from a petrochemical plant or a refinery. The mixture is typically a multicomponent mixture, containing the gaseous hydrocarbon from which it is desired to separate hydrogen, as well as at least one other gaseous hydrocarbon, and frequently containing other components such as nitrogen, carbon dioxide or water vapor, for example.

The separation is carried out by running a stream of the gas mixture across a membrane that is selective for hydrogen over the hydrocarbon from which it is to be separated. The process results, therefore, in a permeate stream enriched in hydrogen gas and a residue stream depleted in hydrogen gas. The process can separate hydrogen from methane, hydrogen from ethylene, hydrogen from ethane, hydrogen from $C_{3+}$ hydrocarbon vapors, hydrogen from halogenated hydrocarbons, or any combination of these, for example.

The process differs from processes previously available in the art in that:

(i) the membranes are able to provide useful separation properties for multicomponent gas mixtures, including, but not limited to, gas mixtures containing $C_{3+}$ hydrocarbon vapors and/or carbon dioxide, even at high levels in the gas mixture, and (ii) the membranes can recover from accidental exposure to liquid organic compounds.

To provide these attributes, the membranes used in the process of the invention are made from a glassy polymer or copolymer. The polymer is characterized by having repeating units of a fluorinated, cyclic structure, the ring having at least five members. The polymer is further characterized by a fractional free volume no greater than about 0.3 and preferably by a glass transition temperature, Tg, of at least about 100° C. Preferably, the polymer is perfluorinated.

In the alternative, the membranes are characterized in terms of their selectivity before and after exposure to liquid hydrocarbons. Specifically, the membranes have a post-exposure selectivity for hydrogen over the gaseous hydrocarbon from which it is desired to separate hydrogen, after exposure of the separation membrane to a liquid hydrocarbon, for example, toluene, and subsequent drying, that is at least about 60%, 65% or even 70% of a pre-exposure selectivity for hydrogen over the gaseous hydrocarbon, the pre- and post-exposure selectivities being measured with a test gas mixture of the same composition and under like conditions.

In this case, the selective layer is again made from an amorphous glassy polymer or copolymer with a fractional free volume no greater than about 0.3 and a glass transition temperature, Tg, of at least about 100° C. The polymer is fluorinated, generally heavily fluorinated, by which we mean having a fluorine:carbon ratio of atoms in the polymer of at least about 1:1. Preferably, the polymer is perfluorinated. In this case the polymer need not incorporate a cyclic structure.

In a basic embodiment, the process of the invention includes the following steps:

(a) bringing a multicomponent gas mixture comprising hydrogen, a gaseous hydrocarbon, and a third gaseous component into contact with the feed side of a separation membrane having a feed side and a permeate side, the membrane having a selective layer comprising: a polymer comprising repeating units having a fluorinated cyclic structure of an at least 5-member ring, the polymer having a fractional free volume no greater than about 0.3;

(b) providing a driving force for transmembrane permeation;

(c) withdrawing from the permeate side a permeate stream enriched in hydrogen compared to the gas mixture;

(d) withdrawing from the feed side a residue stream depleted in hydrogen compared to the gas mixture.

In the alternative, a basic embodiment of the process includes the following steps:

(a) bringing a multicomponent gas mixture comprising hydrogen, a gaseous hydrocarbon, and a third gaseous component into contact with the feed side of a separation membrane having a feed side and a permeate side, the membrane having a selective layer comprising a polymer having:

(i) a ratio of fluorine to carbon atoms in the polymer greater than 1:1;
(ii) a fractional free volume no greater than about 0.3; and
(iii) a glass transition temperature of at least about 100° C.;
    and the separation membrane being characterized by a post-exposure selectivity for hydrogen over the first gaseous hydrocarbon, after exposure of the separation membrane to liquid toluene and subsequent drying, that is at least about 65% of a pre-exposure selectivity for hydrogen over the gaseous hydrocarbon, as measured pre- and post-exposure with a test gas mixture of the same composition and under like conditions;
(b) providing a driving force for transmembrane permeation;
(c) withdrawing from the permeate side a permeate stream enriched in hydrogen compared to the gas mixture;
(d) withdrawing from the feed side a residue stream depleted in hydrogen compared to the gas mixture.

The permeate stream or the residue stream, or both, may be the useful products of the process.

Examples of hydrocarbons from which hydrogen may be separated include, but are not limited to, paraffins, both straight and branched, for example, methane, ethane, propane, butanes, pentanes, hexanes; olefins and other aliphatic unsaturated organics, for example, ethylene, propylene, butene; aromatic hydrocarbons, for example, benzene, toluene, xylenes; vapors of halogenated solvents, for example, methylene chloride, perchloroethylene; alcohols; ketones; and diverse other volatile organic compounds. In many cases, the gas mixture to be treated contains multiple of these components.

Particularly preferred materials for the selective layer of the membrane used to carry out the process of the invention are amorphous homopolymers of perfluorinated dioxoles, dioxolanes or cyclic alkyl ethers, or copolymers of these with tetrafluoroethylene. Specific most preferred materials are copolymers having the structure:

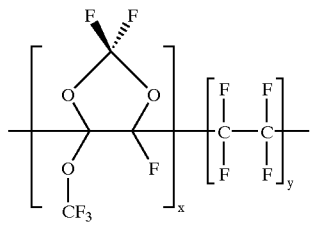

where x and y represent the relative proportions of the dioxole and the tetrafluoroethylene blocks, such that x+y=1.

A second highly preferred material has the structure:

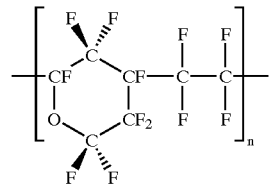

where n is a positive integer.

Contrary to what would be expected from the data presented in the Pinnau et al. *Journal of Membrane Science* paper, we have unexpectedly found that membranes formed from fluorinated cyclic polymers as characterized above can withstand exposure to $C_{3+}$ hydrocarbons well enough to provide useful separation capability for gas mixtures that include $C_{3+}$ hydrocarbon vapors. This resistance persists even when the $C_{3+}$ hydrocarbons are present at high levels, such as 5%, 10%, 15% or even more.

Thus, a particularly important advantage of the invention is that the membranes can retain selectivity for hydrogen even in the presence of streams rich in, or even essentially saturated with, $C_{3+}$ hydrocarbon vapors. This distinguishes these membrane materials from all other membrane materials previously used commercially for hydrogen separations.

Membranes made from fluorinated dioxoles have been believed previously to behave like conventional membrane materials in suffering from debilitating plasticization in a hydrocarbon containing environment, to the point that they may even become selective for hydrocarbons over permanent gas even at moderate $C_{3+}$ hydrocarbon partial pressures. We have discovered that this is not the case for the membranes taught herein. This unexpected result is achieved because the membranes used in the invention are unusually resistant to plasticization by hydrocarbon vapors.

The membranes are also resistant to contact with liquid hydrocarbons, in that they are able to retain their selectivity for hydrogen over methane after prolonged exposure to liquid toluene, for example. This is a second beneficial characteristic that differentiates the processes of the invention from prior art processes. In the past, exposure of the membranes to liquid hydrocarbons frequently meant that the membranes were irreversibly damaged and had to be removed and replaced.

Besides withstanding exposure during use, their resistance to hydrocarbons enables the membranes and modules to be cleaned with hydrocarbon solvents to remove oils or other organic materials that may have been deposited during operation. This is an additional and beneficial improvement over processes previously available in the art.

These unexpected and unusual attributes render the process of the invention useful, not only in situations where commercial gas separation membranes have been used previously, but also in situations where it was formerly difficult or impractical for membrane separation to be used, or where membrane lifetimes were poor.

Because the preferred polymers are glassy and rigid, an unsupported film of the polymer may be usable in principle as a single-layer gas separation membrane. However, such layer will normally be far too thick to yield acceptable transmembrane flux, and in practice, the separation membrane usually comprises a very thin selective layer that forms part of a thicker structure, such as an asymmetric membrane or a composite membrane. The making of these types of membranes is well known in the art.

If the membrane is a composite membrane, the support layer may optionally be made from a fluorinated polymer also, making the membrane a totally fluorinated structure and enhancing chemical resistance. The membrane may take any form, such as hollow fiber, which may be potted in cylindrical bundles, or flat sheets, which may be mounted in plate-and-frame modules or formed into spiral-wound modules.

The driving force forpermeation across the membrane is the pressure difference between the feed and permeate sides, which can be generated in a variety of ways. The pressure difference may be provided by compressing the feedstream, drawing a vacuum on the permeate side, or a combination of both. The membrane is able to tolerate high feed pressures, such as above 200 psia, 300 psia, 400 psia or more. As mentioned above, the membrane is able to operate satisfactorily in the presence of $C_{3+}$ hydrocarbons at high levels. Thus the partial pressure of the hydrocarbons in the feed may be close to saturation. For example, depending on the mix of hydrocarbons and the temperature of the gas, the aggregate partial pressure of all $C_{3+}$ hydrocarbons in the gas might be as much as 10 psia, 15 psia, 25 psia, 50 psia, 100 psia, 200 psia or more. Expressed as a percentage of the saturation vapor pressure at that temperature, the partial pressure of hydrocarbons, particularly $C_{3+}$ hydrocarbons, may be 20%, 30%, 50% or even 70% or more of saturation.

The membrane separation process may be configured in many possible ways, and may include a single membrane unit or an array of two or more units in series or cascade arrangements. The processes of the invention also include combinations of the membrane separation process defined above with other separation processes, such as adsorption, absorption, distillation, condensation or other types of membrane separation.

The scope of the invention in this aspect is not intended to be limited to any particular gas streams, but to encompass any situation where a multicomponent gas stream containing at least hydrogen, a hydrocarbon gas and a third component is to be separated. The composition of the gas may vary widely, from a mixture that contains minor amounts of hydrogen in admixture with various hydrocarbon components, including relatively heavy hydrocarbons, such as $C_5$–$C_8$ hydrocarbons or heavier, to a mixture of mostly hydrogen, such as 80% hydrogen, 90% hydrogen or above, with methane and other very light components, to an essentially binary mixture of hydrogen and methane with only very small amounts of other minor components, such as carbon dioxide or water vapor.

The process of the invention typically provides a selectivity, as measured with the gas mixture to be separated, even if the gas contains significant amounts of $C_{3+}$ hydrocarbon vapor, for hydrogen over methane of at least about 10, for hydrogen over propane of at least about 50, and for hydrogen over n-butane of at least about 100. Frequently, the hydrogen/methane selectivity achieved is 20 or more.

It is an object of the present invention to provide a membrane-based process for separation of hydrogen from a gaseous hydrocarbon.

Additional objects and advantages of the invention will be apparent from the description below to those of ordinary skill in the art.

It is to be understood that the above summary and the following detailed description are intended to explain and illustrate the invention without restricting its scope.

DETAILED DESCRIPTION OF THE INVENTION

Figure 1:
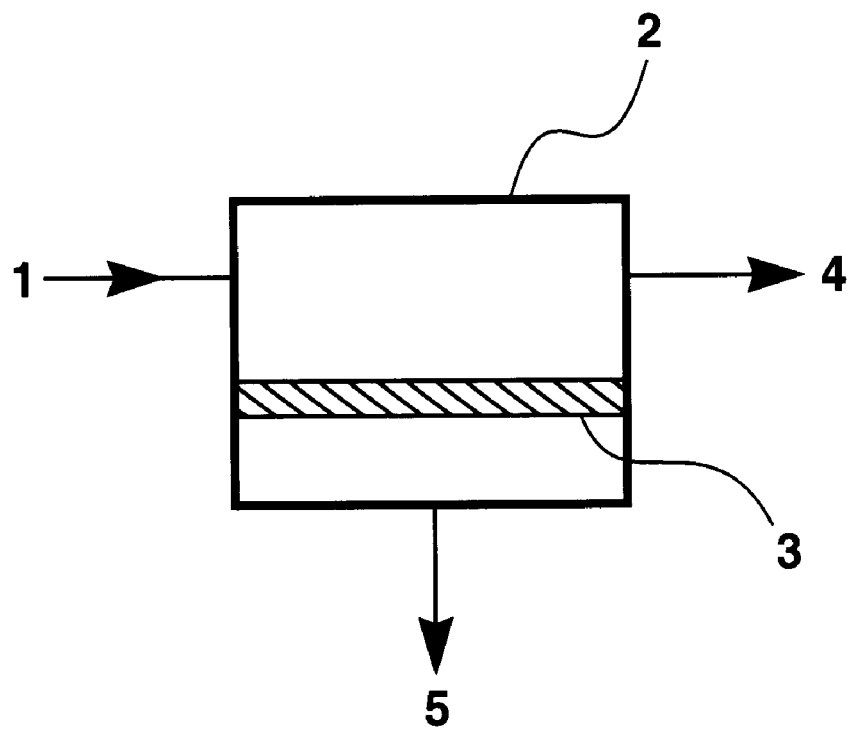
FIG. 1 is a schematic representation of the process of the invention in its most basic form.

The term gas as used herein means a gas or a vapor.

The terms hydrocarbon, gaseous hydrocarbon, organic vapor or organic compound are used interchangeably herein, and include, but are not limited to, saturated and unsaturated compounds of hydrogen and carbon atoms in straight chain, branched chain and cyclic configurations, including aromatic configurations, as well as compounds containing oxygen, nitrogen, halogen or other atoms.

The term $C_{2+}$ hydrocarbon means a hydrocarbon having at least two carbon atoms; the term $C_{3+}$ hydrocarbon means a hydrocarbon having at least three carbon atoms; and so on.

The term light hydrocarbon means a hydrocarbon molecule having no more than about six carbon atoms.

The term heavier hydrocarbon means a $C_{3+}$ hydrocarbon.

The term multicomponent gas mixture means a mixture containing at least hydrogen, a gaseous hydrocarbon and a third gaseous component. The components may be present in any proportions.

All percentages herein are by volume unless otherwise stated.

The invention is a process for separating hydrogen from a hydrocarbon component in a gas mixture. The separation is carried out by running a stream of the gas mixture across a membrane that is selective for hydrogen over the hydrocarbon component from which it is to be separated. The process results, therefore, in a permeate stream enriched in hydrogen and a residue stream depleted in hydrogen.

The feed gas mixture to be separated often contains multiple hydrocarbon components in addition to hydrogen. The goal of the process may be to separate one, some or all of these components from the hydrogen.

As one non-limiting example, the gas mixture may comprise $C_{1-4}$ hydrocarbons and hydrogen, and it may be desired to reduce the $C_{3+}$ hydrocarbon content. The process might then provide a permeate enriched in hydrogen, methane and $C_2$ hydrocarbons and a residue enriched in $C_{3+}$ hydrocarbons compared with the raw gas. Alternatively, the same feed may be processed to provide a permeate that is enriched only in hydrogen and a residue that is enriched in all of the hydrocarbons compared with the feed.

As a second non-limiting example, the feed stream may comprise hydrogen, propylene and propane. The process might then provide a permeate enriched in hydrogen and propylene and a residue enriched in propane, or alternatively may provide a hydrogen-enriched permeate and an olefin- and paraffin-enriched residue.

As a third non-limiting example, the feed stream may comprise hydrogen and methane, and may be separated to provide a hydrogen-enriched permeate and a methane-enriched residue compared with the feed stream.

In other words, the cut between hydrogen and hydrocarbons may be made to achieve as much separation from any specific hydrocarbon as is desired, subject of course to the relative permeabilities of the hydrocarbons in the mix.

Thus, the scope of the invention in this aspect is not intended to be limited to any particular gas streams, but to encompass any situation where a multicomponent gas stream containing hydrogen and a hydrocarbon gas is to be treated. The composition of the gas may vary widely, from a mixture that contains minor amounts of hydrogen in admixture with various hydrocarbon components, including relatively heavy hydrocarbons, such as $C_5$–$C_8$ hydrocarbons or heavier, to a mixture of mostly hydrogen, such as 80% hydrogen, 90% hydrogen or above, with methane and/or other very light components.

Besides hydrogen and the hydrocarbon from which the hydrogen is to be separated, the gas may contain any other components. Representative, but non-limiting gases or vapors that may be included in the gas mixture to be treated include acid gases, water vapor, paraffins, olefins, aromatic hydrocarbons, halogenated hydrocarbons, alcohols and ketones, singly or together.

The process of the invention in its most basic form is shown in FIG. 1. Referring to this figure, a feedstream, 1, comprising a gas mixture including hydrogen and at least one organic compound, is passed into membrane separation unit 2 and flows across the feed side of membrane 3. The membrane is characterized by having a selective layer comprising a polymer containing repeat units having a fluorinated cyclic structure of an at least 5-member ring, the polymer having a fractional free volume no greater than about 0.3. Under a pressure difference between the feed and permeate sides of the membrane, hydrogen passes preferentially to the permeate side, and hydrogen-enriched stream, 5, is withdrawn from the permeate side. The remaining hydrogen-depleted, organic-compound-enriched residue stream, 4, is withdrawn from the feed side. The permeate stream or the residue stream, or both, may be the useful products of the process.

The process differs from previous hydrogen/hydrocarbon separation processes in the nature of the membrane, 3, that is used. The membranes are, as described above, able to maintain useful separation properties for multicomponent mixtures, including those containing organic compounds, particularly $C_{3+}$ hydrocarbon vapors, and/or carbon dioxide, at high partial pressure, and able to recover from accidental or deliberate exposure to liquid hydrocarbons.

To provide these attributes, the membranes used in the process of the invention are made from a glassy polymer, characterized by having repeating units of a fluorinated, cyclic structure, the ring having at least five members. The polymer is further characterized by a fractional free volume no greater than about 0.3 and preferably by a glass transition temperature, Tg, of at least about 100° C. Preferably, the polymer is perfluorinated.

In the alternative, the membranes are characterized in terms of their selectivity before and after exposure to liquid hydrocarbons. Specifically, the membranes have a post-exposure selectivity for hydrogen over the gaseous hydrocarbon from which it is desired to separate hydrogen, after exposure of the separation membrane to a liquid hydrocarbon, for example, toluene, and subsequent drying, that is at least about 60%, 65% or even 70% of a pre-exposure selectivity for hydrogen over the gaseous hydrocarbon, the pre- and post-exposure selectivities being measured with a test gas mixture of the same composition and under like conditions.

In applying this test to determine whether the membrane is suitable for use in the process of the invention, it is important to test the membrane itself, and not just a film of the selective layer polymer. A thick film, for example 50 $\mu$m or more thick, of the selective layer polymer may appear to resist dissolution and swelling and maintain selectivity, even when soaked for days in liquid hydrocarbon. However, when used in an asymmetric or composite membrane with a selective layer thin enough to provide useful transmembrane flux for the desired gas (which may mean a selective layer as thin as 10 $\mu$m, 5 $\mu$m, 1 $\mu$m or less), the same material may disintegrate within minutes of contact with the hydrocarbon liquid.

It is also important that the test gas mixtures used to measure the selectivity before and after exposure have essentially the same composition, and that the test be carried out under essentially the same conditions of pressure, temperature, gas flow and membrane area, since all of these parameters may have an effect on selectivity. The test gas mixture should obviously contain hydrogen and the gaseous hydrocarbon, for example, methane, propane, propylene orbenzene, from which it is desired to separate hydrogen, but need not be identical in composition to the feed gas mixture to the process, since this may change from time to time in any case.

It is preferred that the hydrocarbon liquid to which the membrane is exposed in the test is an aromatic liquid, such as toluene, rather than a paraffin, for example, since this provides more aggressive test conditions. The test can be carried out in any convenient manner. A simple and preferred protocol is to measure the membrane selectivity using a bench-top test cell apparatus such as is familiar to those of skill in the art, remove the membrane stamp from the test cell, immersing it in liquid toluene for a period, remove it, dry it in air and retest it as before. For an adequate test, the period of immersion should be representative of the exposure that might occur during a system upset when the membrane is in use, such as one or two hours, or overnight (about eight hours).

In this case the polymer need not incorporate a cyclic structure. The selective layer is again made from an amorphous glassy polymer or copolymer with a fractional free volume no greater than about 0.3 and a glass transition temperature, Tg, of at least about 100° C. The polymer is fluorinated, generally heavily fluorinated, by which we mean having a fluorine:carbon ratio of atoms in the polymer of at least about 1:1. Preferably, the polymer is perfluorinated, even if the perfluorinated structure has a less than 1:1 fluorine:carbon ratio.

The preferred cyclic or non-cyclic polymers are not new materials in themselves. In fact, general polymer formulations embracing those suitable for use in the invention are described in patents dating back from the present day to the 1960s, for example, U.S. Pat. No. 3,308,107; 3,488,335; 3,865,845; 4,399,264; 4,431,786; 4,565,855; 4,594,399; 4,754,009; 4,897,457; 4,910,276; 5,021,602; 5,117,272; 5,268,411; 5,498,682; 5,510,406; 5,710,345; 5,883,177; 5,962,612; and 6,040,419.

The ring structure within the repeat units may be aromatic or non-aromatic, and may contain other atoms than carbon, such as oxygen atoms. Preferred polymers for the selective layer of the membrane are formed from fluorinated monomers of (i) dioxoles, which are five-member rings of the form

that polymerize by opening of the double bond, or (ii) dioxolanes, similar five-member rings but without the double bond in the main ring, or (iii) aliphatic structures having an alkyl ether group, polymerizable into cyclic ether repeat units with five or six members in the ring.

Not all polymers within the above structural definitions and preferences are suitable for use as membrane selective layers in the invention. For example, certain of the polymers and copolymers of perfluoro-2,2-dimethyl-1,3-dioxole reported in U.S. Pat. No. 5,051,114 have been shown to be susceptible to plasticization to the point of switching from being selective for nitrogen over hydrocarbons to being selective for hydrocarbons over nitrogen as the hydrocarbon partial pressure increases.

These polymers are, however, characterized by very high fractional free volume within the polymer, typically above 0.3. For example, a paper by A. Yu. Alentiev et al, "High transport parameters and free volume of perfluorodioxole copolymers", *Journal of Membrane Science*, Vol. 126, pages 123–132 (1997) reports fractional free volumes of 0.32 and 0.37 for two grades of perfluoro-2,2-dimethyl-1,3-dioxole copolymers (Table 1, page 125). Likewise, these polymers are of low density compared with other polymers, such as below about 1.8 g/cm$^3$ and are unusually gas permeable, for instance exhibiting pure gas permeabilities as high as 1,000 Barrer or more for oxygen and as high as 2,000 Barrer or more for hydrogen.

It is believed that polymers with denser chain packing, and thus lower fractional free volume, higher density and lower permeability, are more resistant to plasticization. Hence, the polymers used in the invention to form the selective, discriminating layer of the membrane should preferably be limited, in addition to the specific structural limitations defined and discussed above, to those having a fractional free volume less than about 0.3.

In referring to fractional free volume (FFV), we mean the free volume per unit volume of the polymer, defined and calculated as:

$$FFV = SFV/v_{sp}$$

where SFV is the specific free volume, calculated as:

$$SFV = v_{sp} - v_0 = v_{sp} - 1.3\, v_w$$

and where:

$v_{sp}$ is the specific volume (cm$^3$/g) of the polymer determined from density or thermal expansion measurements, $v_0$ is the zero point volume at 0° K, and $v_w$ is the van der Waals volume calculated using the group contribution method of Bondi, as described in D. W. van Krevelan, *Properties of Polymers*, 3$^{rd}$ Edition, Elsevier, Amsterdam, 1990, pages 71–76.

Expressed in terms of density, the selective layer polymers should preferably have a density above about 1.8 g/cm$^3$. Expressed in terms of permeability, the selective layer polymers will generally exhibit an oxygen permeability no higher than about 300 Barrer, more typically no higher than about 100 Barrer, and a hydrogen permeability no higher than about 1,000 Barrer, more typically no higher than about 500 Barrer.

Since the polymers used for the selective layer need to remain rigid and glassy during operation, they should also have glass transition temperatures comfortably above temperatures to which they are typically exposed during the process. Polymers with glass transition temperature above about 100° C. are preferred, and, subject also to the other requirements and preferences above, the higher the glass transition temperature, in other words, the more rigid the polymer, the more preferred it is.

The polymers should preferably take amorphous, rather than crystalline form, because crystalline polymers are typically essentially insoluble and thus render membrane making difficult, as well as exhibiting low gas permeability.

As stated above, the polymers are fluorinated. More preferably, they have a fluorine:carbon ratio of atoms in the polymer of at least about 1:1, and most preferably, they are perfluorinated.

The polymers may be homopolymers of the repeating units of fluorinated cyclic structures defined above. Optionally, they may be copolymers of such repeat units with other polymerizable repeat units. For preference, these other repeat units should be at least partially fluorinated, and most preferably heavily fluorinated or perfluorinated. A number of suitable materials are known, for example, fluorinated ethers, ethylene and propylene. Particularly when perfluorinated, homopolymers made from these materials, such as polytetrafluoroethylene (PTFE) and the like, are very resistant to plasticization. However, they tend to be crystalline or semi-crystalline and to have gas permeabilities too low for any useful separation application. As constituents of copolymers with the fluorinated ring structures defined above, however, they can produce materials that combine amorphous structure, good permeability and good resistance to plasticization. Copolymers that include tetrafluoroethylene units are particularly preferred. Other specific examples of copolymers that are suitable are polyhexafluoropropylene and chlorofluoro ethylenes and propylenes.

Specific most preferred materials are copolymers of tetrafluoroethylene with 2,2,4-rifluoro-5-trifluoromethoxy-1,3-dioxole having the structure:

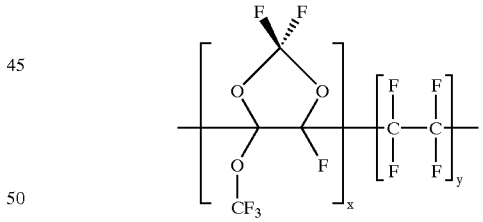

where x and y represent the relative proportions of the dioxole and the tetrafluoroethylene blocks, such that x+y=1.

Such materials are available commercially from Ausimont S.p.A., of Milan, Italy under the trade name Hyflon® AD. Different grades are available varying in proportions of the dioxole and tetrafluoroethylene units, with fluorine:carbon ratios of between 1.5 and 2, depending on the mix of repeat units. For example, grade Hyflon AD 60 contains a 60:40 ratio of dioxole to tetrafluoroethylene units, has a fractional free volume of 0.23, a density of 1.93 g/cm$^3$ and a glass transition temperature of 121° C., and grade Hyflon AD 80 contains an 80:20 ratio of dioxole to tetrafluoroethylene units, has a fractional free volume of 0.23, a density of 1.92 g/cm$^3$ and a glass transition temperature of 134° C.

A second highly preferred group of materials is the set of polyperfluoro (alkenyl vinyl ethers) including polyperfluoro (allyl vinyl ether) and polyperfluoro (butenyl vinyl ether). A specific most preferred material of this type has the structure:

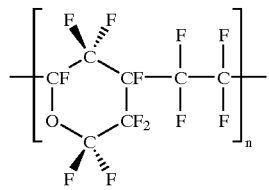

where n is a positive integer.

This material is available commercially from Asahi Glass Company, of Tokyo, Japan under the trade name Cytop®.

Cytop has a fractional free volume of 0.21, a density of 2.03 g/cm³, a glass transition temperature of 108° C., and a fluorine:carbon ratio of 1.7.

A third group of materials that is believed to contain useful selective layer materials is perfluorinated polyimides. Such materials have been investigated for use as optical waveguides, and their preparation is described, for example, in S. Ando et al., "Perfluorinated polymers for optical waveguides", CHEMTECH, December, 1994. To be usable as membrane materials, the polyimides have to be capable of being formed into continuous films. Thus, polyimides that incorporate ether or other linkages that give some flexibility to the molecular structure are preferred.

Particular examples are polymers comprising repeat units prepared from the perfluorinated dianhydride 1,4-bis(3,4-dicarboxytrifluorophenoxy) tetrafluorobenzene (10FEDA), which has the structure:

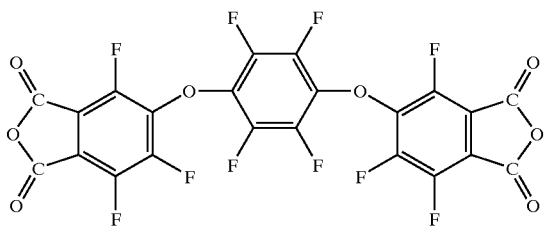

Diamines with which 10FEDA can be reacted to form polyamic acids and hence polyimides include 4FMPD, which has the structure:

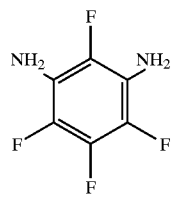

The resulting 10FEDA/4FMPD polyimide has the repeat unit structure:

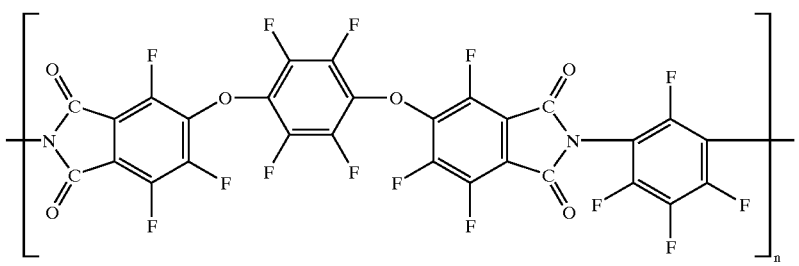

Yet further discussion of membrane materials is included in copending application Ser. No. 09/574,303, entitled "Gas Separation Using $C_{3+}$ Hydrocarbon Resistant Membranes" (U.S. Pat. No. 6,361,582) incorporated herein by reference in its entirety.

The polymer chosen for the selective layer can be used to form films or membranes by any convenient technique known in the art, and may take diverse forms. Because the polymers are glassy and rigid, an unsupported film, tube or fiber of the polymer may be usable in principle as a single-layer membrane. In this case, our preferred method of manufacture is to prepare a solution of the polymer in a perfluorinated solvent and to cast the solution onto a glass plate or a removable or non-removable backing web, according to general casting procedures that are well known in the art. The resulting flat-sheet membrane films may be dried under ambient conditions, at elevated temperature, or under vacuum as desired to produce thin film membranes.

Alternatively, the membrane may be manufactured in the form of hollow fibers, the general methods for preparation of which are copiously described in the literature, for example in U.S. Pat. No. 3,798,185 to Skiens et al., incorporated herein by reference.

However, such single-layer films will normally be too thick to yield acceptable transmembrane flux, and in practice, the separation membrane usually comprises a very thin selective layer that forms part of a thicker structure, such as an integral asymmetric membrane, comprising a dense region that forms the separation membrane and a microporous support region. Such membranes were originally developed by Loeb and Sourirajan, and their preparation in flat sheet or hollow fiber form is now conventional in the art and is described, for example, in U.S. Pat. Nos. 3,133,132 to Loeb, and 4,230,463 to Henis and Tripodi.

As a further, and a preferred, alternative, the membrane may be a composite membrane, that is, a membrane having multiple layers. Modern composite membranes typically comprise a highly permeable but relatively non-selective support membrane, which provides mechanical strength, coated with a thin selective layer of another material that is primarily responsible for the separation properties. Typically, but not necessarily, such a composite membrane is made by solution-casting the support membrane, then solution-coating the selective layer.

General preparation techniques for making composite membranes of this type are well known, and are described, for example, in U.S. Pat. No. 4,243,701 to Riley et al., incorporated herein by reference. If the membrane is made in the form of a composite membrane, it is particularly preferred to use a fluorinated or perfluorinated polymer, such as polyvinylidene fluoride, to make the microporous support membrane. Again, the membrane may take flat-sheet, tube or hollow-fiber form. The most preferred support membranes are those with an asymmetric structure, which provides a smooth, comparatively dense surface on which to coat the selective layer. Support membranes are themselves frequently cast onto a backing web of paper or fabric.

As an alternative to coating onto a support membrane, it is also possible to make a composite membrane by solution-casting the polymer directly onto a non-removable backing web, as mentioned above. In hollow-fiber form, multilayer composite membranes may be made by a coating procedure as taught, for example, in U.S. Pat. Nos. 4,863,761; 5,242,636; and 5,156,888, or by using a double-capillary spinneret of the type taught in U.S. Pat. Nos. 5,141,642 and 5,318,417.

The membrane may also include additional layers, such as a gutter layer between the microporous support membrane and the selective layer, or a sealing layer on top of the selective layer. A gutter layer generally has two purposes. The first is to coat the support with a material that seals small defects in the support surface, and itself provides a smooth, essentially defect-free surface onto which the selective layer may be coated. The second is to provide a layer of highly permeable material that can channel permeating molecules to the relatively widely spaced pores in the support layer.

Preferred materials for the gutter layer are fluorinated or perfluorinated, to maintain high chemical resistance through the membrane structure, and of very high permeability. Particularly preferred for the gutter layer, although they are unsuitable for the selective layer, are the perfluorinated dioxole polymers and copolymers of U.S. Pat. No. 5,051,114 referred to above, having fractional free volume greater than 0.3 and extraordinarily high permeability, such as copolymers of perfluoro-2,2-dimethyl-1,3-dioxole and tetrafluoroethylene, available commercially as Teflon® AF from DuPont Fluoroproducts of Wilmington, Del. Such materials, or any others of good chemical resistance that provide protection for the selective layer without contributing significant resistance to gas transport, are also suitable as sealing layers.

Multiple selective layers may also be used.

When in use, the membranes typically provide a selectivity for hydrogen over methane of at least about 10, for hydrogen over propane of at least about 50, and for hydrogen over n-butane of at least about 100. Frequently, the hydrogen/methane selectivity achieved is 20 or more. Such selectivities are remarkable, in that they can be achieved even in the presence of significant concentrations of $C_{3+}$ hydrocarbons, and at high feed pressure.

The thickness of the selective layer or skin of the membranes can be chosen according to the proposed use, but will generally be no thicker than 10 $\mu$m, and typically no thicker than 5 $\mu$m. It is preferred that the selective layer be sufficiently thin that the membrane provide a pressure-normalized hydrogen flux, as measured with pure hydrogen gas at 25° C., of at least about 50 GPU (where 1 GPU=1× $10^{-6}$ cm$^3$(STP)/cm$^2$·s·cmHg), more preferably at least about 100 GPU and most preferably at least about 200 GPU. In general, the membranes of the invention provide transmembrane gas fluxes that are high compared with membranes using conventional hydrogen-separating materials, such as polyimides, cellulose acetate and polysulfone.

Once formed, the membranes exhibit a combination of good mechanical properties, thermal stability, and high chemical resistance. The fluorocarbon polymers that form the selective layer are typically insoluble except in perfluorinated solvents and are resistant to acids, alkalis, oils, low-molecular-weight esters, ethers and ketones, aliphatic and aromatic hydrocarbons, and oxidizing agents, making them suitable for use not only in the presence of $C_{3+}$ hydrocarbons, but in many other hostile environments.

The membranes of the invention may be prepared in any known membrane form and housed in any convenient type of housing and separation unit. We prefer to prepare the membranes in flat-sheet form and to house them in spiral-wound modules. However, flat-sheet membranes may also be mounted in plate-and-frame modules or in any other way. If the membranes are prepared in the form of hollow fibers or tubes, they may be potted in cylindrical housings or otherwise.

The membrane separation unit, 2, comprises one or more membrane modules. The number of membrane modules required will vary according to the volume of gas to be treated, the composition of the feed gas, the desired compositions of the permeate and residue streams, the operating pressure of the system, and the available membrane area per module. Systems may contain as few as one membrane module or as many as several hundred or more. The modules may be housed individually in pressure vessels or multiple elements may be mounted together in a sealed housing of appropriate diameter and length.

The composition and pressure at which the feedstream, 1, is supplied to the membrane modules varies depending on the source of the stream. If the feed gas stream to be treated is at high pressure compared with atmospheric, such as 200 psia, 400 psia, 500 psia or above, the separation may be effected simply by making use of this high pressure to provide an adequate driving force and feed:permeate pressure ratio. Otherwise, a pressure difference can be provided by compressing the feed stream, by drawing a vacuum on the permeate side of the membrane, or a combination of both. Polymer membranes can typically withstand pressure differences between the feed and permeate side up to about 1,500–2000 psi, so it might occasionally be necessary to let down the gas pressure before it can be fed to the membrane system.

An important consideration is the effect of hydrocarbons, particularly $C_{3+}$ hydrocarbons, in the feed stream. Unlike prior art membranes, the membranes of the invention can maintain useful gas/hydrocarbon separation performance, in terms of transmembrane gas flux and selectivity, when exposed to high concentrations of such organics, even when the gas mixture is close to saturation with these compounds. This is true with respect to a broad range of hydrocarbons, including paraffins, olefins, aromatics, such as benzene, toluene and xylenes (BTEX), alcohols and chlorinated compounds. These properties are different from those reported in the literature for dioxole membranes, as well as obtained with prior art conventional membrane materials, such as cellulose acetate, polysulfone, or polyimides that are not perfluorinated.

Even if condensation of organic liquid does accidentally occur from time to time, the membrane unit can generally be purged with, for example, an inert gas such as nitrogen, and the membranes will frequently continue thereafter to exhibit adequate gas/hydrocarbon selectivity properties.

In contrast, prior art membranes in commercial use are generally plasticized and irreversibly damaged by exposure to $C_{3+}$ hydrocarbon vapors at any significant concentration, such as more than about 10%, 20% or 25%, or at more modest concentrations, such as less than 10%, for prolonged periods, and cannot withstand even fleeting exposure to condensed organic liquids.

The ability of the membranes to withstand exposure to organic compounds means that the membrane modules may be cleaned with organic solvents. This is a very useful property. Industrial gas streams often contain small amounts of entrained oils and other relatively heavy organic components, which may enter the separation system and become trapped in the modules, fouling the membrane surface. Even if the membranes themselves are not damaged, the performance may be adversely affected by the build-up of such materials. One attractive feature of the present invention is that the modules can be cleaned periodically or as required by flushing with organic solvents to remove such contaminants.

As a rough general guide, expressed as a concentration, the feed gas treated by the process of the invention may have a hydrocarbons content, including $C_{3+}$ hydrocarbon vapors, of at least about 5%, 10%, 15%, 20% or higher. Expressed in terms of partial pressure, the feed stream may often be acceptable with a partial pressure of $C_{3+}$ hydrocarbons of as high as 15 psia, 25 psia, 50 psia, 100 psia or more, assuming a gas temperature of ambient or above; and the residue stream partial pressure of the $C_{3+}$ hydrocarbons together can often be as high as 50 psia, 100 psia, 150 psia or 200 psia, again assuming a temperature of ambient or above. Expressed as the ratio of the feed pressure, P, to the saturation vapor pressure, $P_{sat}$, of the gas mixture, which is an approximate measure of the activity of the gas, the feed gas may be supplied to the membrane separation step at pressure and temperature conditions that result in the percentage $P/P_{sat}$ being at least about 25%, 30%, 50%, 60%, 70% or higher.

Methane and $C_2$ components, which tend to have low boiling points, and to be less condensable and less harmful in terms of their plasticizing ability, can generally be present in any concentration.

Typical examples of compositions and pressures of feed gases suitable for treatment by the process of the invention, include, but are not limited to, mixtures of hydrogen with methane and $C_2$–$C_8$ paraffins and olefins having a $C_{3+}$ hydrocarbon content of as much as 15–20% or more at a total feed pressure of 400 psia; mixtures of hydrogen and methane of any composition and pressure; and mixtures of hydrogen with $C_1$–$C_4$ paraffins having a total hydrocarbon content of as much as 60% or more at a total feed pressure of 500 psia.

Depending on the performance characteristics of the membrane, and the operating parameters of the system, the process can be designed for varying levels of gas purification and recovery. Single-stage gas-separation processes typically remove up to about 80–95% of the preferentially permeating component from the feed stream and produce a permeate stream significantly more concentrated in that component than the feed gas. This degree of separation is adequate for many applications.

If the residue stream requires further purification, it may be passed to a second bank of modules for a second processing step. If the permeate stream requires further concentration, it may be passed to a second bank of modules for a second-stage treatment. Such multistage or multistep processes, and variants thereof, will be familiar to those of skill in the art, who will appreciate that the membrane separation step, 2, may be configured in many possible ways, including single-stage, multistage, multistep, or more complicated arrays of two or more units in series or cascade arrangements.

In light of their unusual and advantageous properties, the membranes and processes of the invention are useful for many separation applications in refineries, petrochemical plants or the like.

The following list of applications of the invention in this aspect is exemplary, but not limiting: separation of hydrogen from methane and other light hydrocarbons in process and off-gas streams from: hydrocrackers; hydrotreaters of various kinds, including hydrodesulfurization units; coking reactors; catalytic reformers; catalytic crackers; specific isomerization, alkylation and dealkylation units; steam reformers; hydrogenation and dehydrogenation processes; and steam crackers for olefin production, as well as in streams from manufacture of primary petrochemicals, chemical intermediates, fuels, polymers, agricultural chemicals and the like.

Applications range from those treating very large streams, such as separation of hydrogen/light hydrocarbon mixtures in ethylene plant cold trains, to those handling much smaller streams, including recovery of hydrogen from vent streams generated by hydrogen reduction processes.

A particularly attractive use of the process is to recover hydrogen from streams containing less than about 40% hydrogen, and rich in $C_{3+}$ hydrocarbons, for which PSA or cryogenic condensation is not economically attractive. Such streams typically have flow rates below 50 MMscfd, and prior to the availability of the present process were usually not separated, but were used as fuel. This is a waste of valuable resources, as the difference between the fuel and chemical values of such a gas stream can be as much as $2/1,000 scf of gas. Not only is it a waste of resources, however, but in some cases the quantity of fuel-grade gas generated by unit operations in the plant is so great that the plant becomes bottlenecked by over supply of fuel gas.

The process of the invention can be used to produce a hydrogen-rich permeate stream, 5, containing, for example, 90% hydrogen. A stream of such composition may be recompressed and used in other refinery unit operations, or subjected to further treatment to yield high purity hydrogen as required. The hydrocarbon-rich residue stream, 4, may be piped to the fuel header, thereby reducing the volume of fuel gas produced, or sent for LPG recovery, for example. In such a process, recovery of 50%, 60%, 70%, 80% or more of the hydrogen originally present in the waste stream is possible.

A second specific attractive application is hydrogen and olefin recovery from fluid catalytic cracking (FCC) off-gas. The FCC stream is the largest hydrogen-containing off-gas produced in a refinery. FCC off-gas streams are typically in the range 10 to 50 MMscfd and contain 10–20% hydrogen at 100–250 psig. The membrane process of the invention can be used to recover both hydrogen and hydrocarbons from these streams. The hydrogen product, 5, typically containing 80–90% hydrogen, can be used effectively in many applications, such as low-pressure hydrotreating. The hydrocarbon-rich residue, 4, can be used as fuel, or can be sent for olefin recovery from the hydrocarbon mixture by cryogenic distillation or the like.

A third specific application is the separation of hydrogen from ethylene steam cracker product gas. Low molecular weight olefins, particularly ethylene and propylene, are typically made by cracking ethane or propane with steam. The gas mixture leaving the cracker is a mixture of hydrogen, methane, hydrocarbons and carbon dioxide. After carbon dioxide has been removed, for example by absorption into an amine or sodium hydroxide solution, the mixture typically has a composition of about 20% hydrogen, 25–30% methane/ethane, 40–45% ethylene/propylene and 5–10% propane/butane. The process of the invention can be used to separate hydrogen from this mixture, either before or after the product olefins have been removed by cooling/condensation/fractionation.

A final exemplary set of applications is in the treatment of gases circulating in a reactor loop. Many operations carried out in refineries and petrochemical plants involve feeding a hydrocarbon/hydrogen stream to a reactor, withdrawing a reactor effluent stream of different hydrocarbon/hydrogen composition, phase separating the effluent into liquid and vapor portions, and recirculating part of the vapor stream to the reactor, so as to reuse unreacted hydrogen. Such loop operations are found, for example, in the hydrotreater, hydrocracker, and catalytic reformer sections of most modem refineries, as well as in isomerization reactors and hydrodealkylation units.

In addition to hydrogen, the overhead vapor from the phase separation usually contains light hydrocarbons, particularly methane and ethane. In a closed recycle loop, these components build up, change the reactor equilibrium conditions and can lead to catalyst degradation and reduced product yield. This build-up of undesirable contaminants is usually controlled by purging a part of the vapor stream from the loop. Such a purge operation is unselective however, and, since the purge stream may contain as much as 80 vol % or more hydrogen, multiple volumes of hydrogen can be lost from the loop for every volume of contaminant that is purged.

The process of the invention may be used to provide a selective purge capability. The overhead vapor from the phase separation step, or a portion thereof, is treated to provide a purified hydrogen permeate stream, 5, which may be recirculated in the reactor loop, and a hydrocarbon-rich, hydrogen-depleted residue stream, 4, which forms the purge stream. In this way purging can be carried out with reduced loss of hydrogen with the purged gas. Such reactor loops in which the invention can be used are found in hydrocracking, hydrotreating, catalytic reforming and hydrogenation, for example.

Optionally, the processes of the invention already discussed may include other separation steps used in conjunction with the defined membrane separation process. Examples of such separation steps include adsorption, absorption, condensation, and distillation. The other separation steps may be carried out upstream, downstream or both of the membrane separation step, that is, with reference to FIG. 1 on any of streams 1, 4 and 5. As non-limiting examples, streams may be filtered to separate out entrained oil or water droplets, passed through a glycol absorption unit for dehydration, subjected to amine scrubbing to remove hydrogen sulfide or carbon dioxide, or cooled to condense out high boiling components.

As just one more specific illustration, processes that include the membrane separation step combined with a pressure swing adsorption (PSA) step are within the scope of the invention. Details of the operation of PSA units are well documented in the art, and do not require lengthy description here. It is also well known to combine PSA with membrane separation, as is disclosed, for example, in U.S. Pat. No. 6,011,192. PSA is often used to produce high-purity hydrogen from mixed streams containing light hydrocarbons with 60% or more hydrogen. The process generally operates at about 80% recovery; in other words, as much as 20% or more of the hydrogen content of the feed is lost with the tail gas produced when the PSA beds are regenerated.

Membrane processes as described herein can be used to improve hydrogen recovery in several ways. For example, the hydrogen content in low-grade fuel gas, containing typically only 30–40% hydrogen, can be upgraded to render the gas suitable for hydrogen recovery by PSA. With reference yet again to FIG. 1, a low-grade stream is passed as feed stream, 1, to the membrane separation unit, 2, containing a membrane as defined above, 3, that is selectively permeable to hydrogen over hydrocarbons. The hydrogen is concentrated to, for example, 60–70% hydrogen in the permeate stream, 5. At this composition, stream 5 may be compressed, if necessary, and passed as feed to a PSA unit to produce high-quality hydrogen. The residue stream, 4, correspondingly depleted of hydrogen, may be sent to the fuel gas line.

Alternatively or additionally, a membrane step can be used to recover hydrogen currently lost with the tail gas when the PSA beds are regenerated. In this embodiment, a PSA tail gas stream is passed as feed stream, 1, to the membrane separation unit, 2, containing a membrane as defined above, 3, that is selectively permeable to hydrogen over hydrocarbons. The hydrogen is concentrated to, for example, 60–70% hydrogen in the permeate stream, 5. At this composition, stream 5 may be compressed, if necessary, and returned as part of the feed to the PSA unit. The residue stream, 4, correspondingly depleted of hydrogen, may be sent to the fuel gas line.

The invention is now illustrated in further detail by specific examples. These examples are intended to further clarify the invention, and are not intended to limit the scope in any way.

EXAMPLES

Example 1

Membrane Making and Testing

Asymmetric, microporous poly(vinylidene fluoride) [PVDF] support membranes were prepared. Composite membranes were prepared using the following coating solutions:

- 1 wt % copolymer solution of 40% tetrafluoroethylene/60% 2,2,4-trifluoro-5-trifluorometoxy-1,3-dioxole (Hyflon® AD60), (Ausimont, Italy), in a perfluorinated solvent (Fluorinert FC-84), (3M, St. Paul, Minn.).
- 1 wt % copolymer solution of 20% tetrafluoroethylene/80% 2,2,4-trifluoro-5-trifluorometoxy-1,3-dioxole (Hyflon® AD80), (Ausimont, Italy), in FC-84 solvent.
- 1 wt % polyperfluoro (alkenyl vinyl ether) (Cytopt®), (Asahi Gl Glass, Japan), in FC-84 solvent.

The support membranes were dip-coated in a solution of one of the three selective polymer solutions at 1 ft/min coating speed, then dried in an oven at 60° C. for 10 minutes. The resulting membranes had a selective layer thickness ranging from 0.2–0.5 µm.

Samples of each finished composite membrane were cut into 12.6 cm² stamps and tested in a permeation test-cell apparatus with pure gases at 35° C. feed temperature and 65 psia feed pressure. During each test, the feed, permeate, and residue compositions were analyzed by gas chromatography (GC).

The gas fluxes of the membranes were measured, and the selectivities were calculated. Table 1 summarizes the fluxes and Table 2 summarizes the selectivities of the composite membranes, calculated as the ratio of the pure gas fluxes.

TABLE 1

| | Pure-Gas Pressure-Normalized Flux (GPU) | | |
|---|---|---|---|
| Gas | Hyflon ® AD60 | Hyflon ® AD80 | Cytop ® |
| Nitrogen | 52 | 184 | 34 |
| Oxygen | 180 | 574 | 130 |
| Helium | 1,360 | 1,850 | 1,270 |
| Hydrogen | 790 | 2,040 | 620 |
| Argon | 85.4 | 289 | 56 |
| Carbon Dioxide | 433 | — | 300 |
| Methane | 17.6 | 65.8 | 11 |

TABLE 1-continued

| | Pure-Gas Pressure-Normalized Flux (GPU) | | |
|---|---|---|---|
| Gas | Hyflon ® AD60 | Hyflon ® AD80 | Cytop ® |
| Ethane | 4.5 | 18.8 | 3 |
| Ethylene | 9.8 | 35.9 | 5.7 |
| Propane | 1.1 | — | 3.4 |
| Propylene | 5.1 | 25.6 | — |
| $CF_4$ | 0.94 | 3.38 | 0.48 |
| $NF_3$ | 10.3 | 38.8 | 5.7 |

1 GPU = 1 × $10^{-6}$ $cm^3$(STP)/$cm^2$ · s · cmHg

TABLE 2

| | Selectivity (–) | | |
|---|---|---|---|
| Gas Pair | Hyflon ® AD60 | Hyflon ® AD80 | Cytop ® |
| $N_2/CF_4$ | 55 | 58 | 71 |
| $O_2/N_2$ | 3.5 | 3.1 | 3.8 |
| $N_2/CH_4$ | 2.9 | 2.8 | 3.2 |
| $He/H_2$ | 1.7 | 0.91 | 2.0 |
| $Ar/CH_4$ | 4.8 | 4.4 | 5.3 |
| $Ar/C_2H_4$ | 8.7 | 8.0 | 9.7 |
| $CO_2/CH_4$ | 26 | — | 28 |
| $H_2/CH_4$ | 45 | 31 | 59 |
| $N_2/C_2H_4$ | 5.3 | 5.1 | 6.0 |
| $N_2/C_2H_6$ | 10 | 7.2 | — |

Example 2

Solvent Resistance of Hyflon® AD60 compared to Polysulfone

Experiments were carried out to determine the stability of a Hyflon® AD60 membrane in the presence of hydrocarbon solvents. Samples of a Hyflon® AD60 membrane were tested in a permeation test-cell as in Example 1. The fluxes were measured and the selectivities calculated.

The membrane stamps were then immersed in liquid toluene or hexane. After one week, the membranes were removed from the hydrocarbon liquid, dried at ambient temperature, and retested in the gas permeation test-cell. A polysulfone (PSF) asymmetric membrane, typically used in hydrogen separation processes, was also tested for comparison. The permeation properties of the Hyflon® AD60 and polysulfone membranes before and after exposure to the hydrocarbon solvent are summarized in Table 3.

TABLE 3

| | Initial Flux (GPU) | | Initial Selectivity (–) | | Post-Toluene Flux (GPU) | | Post-Toluene Selectivity (–) | |
|---|---|---|---|---|---|---|---|---|
| Membrane | $N_2$ | $H_2$ | $O_2/N_2$ | $H_2/CH_4$ | $N_2$ | $H_2$ | $O_2/N_2$ | $H_2/CH_4$ |
| Hyflon ® | 30 | 350 | 3.1 | 25 | 41 | 477 | 3.1 | 26 |
| PSF | 1.2 | — | 5.6 | — | Dissolved | | | |

| | Initial Flux (GPU) | | Initial Selectivity (–) | | Post-Hexane Flux (GPU) | | Post-Hexane Selectivity (–) | |
|---|---|---|---|---|---|---|---|---|
| Membrane | $N_2$ | $H_2$ | $O_2/N_2$ | $H_2/CH_4$ | $N_2$ | $H_2$ | $O_2/N_2$ | $H_2/CH_4$ |
| Hyflon ® | 31 | 350 | 3.0 | 24 | 41 | 480 | 3.1 | 27 |
| PSF | 0.6 | 50 | 6.8 | 99 | 1.6 | 87 | 5.9 | 48 |

As can be seen, the polysulfone membranes could not withstand exposure to toluene, and their hydrogen/methane selectivity declined by half after exposure to hexane. In contrast, the dioxole copolymer Hyflon® membranes, although they exhibited higher fluxes for all gases for which they were tested after soaking in liquid hydrocarbons, retained their hydrogen/methane selectivity.

Example 3

Membrane Making and Testing with Teflon® AF 2400 Composite Membranes—Not in Accordance with the Invention Asymmetric, microporous poly(vinylidene fluoride) [PVDF] support membranes were prepared. Composite membranes were prepared by dip-coating the support membranes three times in a solution of 1 wt % 2,2-bistrifluoromethyl-4,5-difluoro-1,3-dioxole/ tetrafluoroethylene copolymer [Teflon® AF2400] solution in FC-84 solvent at 1 ft/min coating speed, then dried in an oven at 60° C. for 10 minutes. The resulting membranes had a selective layer thickness of 4 μm.

Samples of each finished composite membrane were cut into 12.6 $cm^2$ stamps and tested in a permeation test-cell apparatus with pure oxygen and nitrogen at 22° C. feed temperature and 65 psia feed pressure. During each test, the feed, permeate, and residue compositions were analyzed by gas chromatography (GC).

The gas fluxes were measured, and the selectivities were calculated. Table 4 summarizes the pressure-normalized fluxes and selectivities of the composite Teflon® AF membranes.

TABLE 4

| Mixed-Gas Pressure-Normalized Flux (GPU) | | Selectivity (−) |
|---|---|---|
| $N_2$ | $O_2$ | $O_2/N_2$ |
| 185 | 353 | 1.9 |

Examples 4–6

Comparison of Pure-Gas Permeation Properties with Hyflon® AD and Teflon® AF2400 Membranes Example 4

Hyflon® AD60 Pure-Gas Permeation Properties

Hyflon® AD60 membranes were prepared as in Example 1, except using a poly(etherimide) support layer. The resulting membranes were tested as in Example 1 with pure hydrogen, nitrogen, methane, ethane, propane, and n-butane at 35° C. at feed pressures ranging from 35 to 165 psia. The n-butane was tested only at 32 psia, which is nearly 70% of the saturation vapor pressure of n-butane at 35° C. The measured pressure-normalized gas fluxes are shown graphically in FIG. 2. The calculated hydrogen/hydrocarbon selectivities are shown in FIG. 3.

Figure 2:
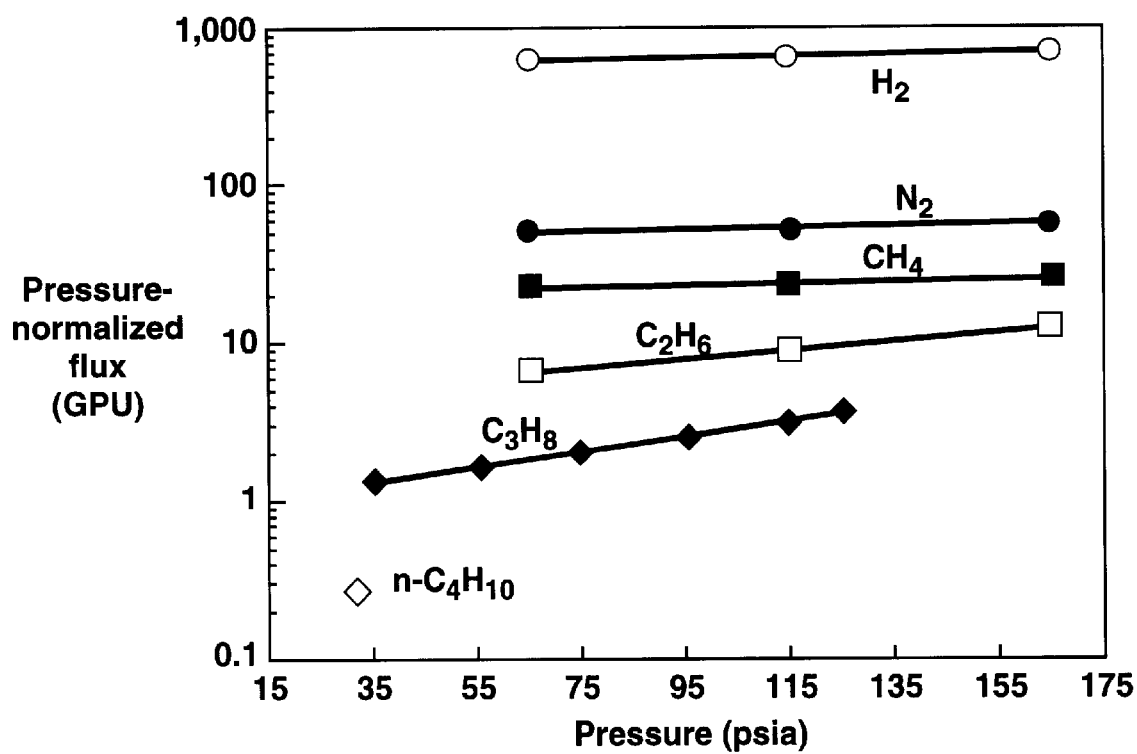
FIG. 2 is a graph of pressure-normalized pure-gas flux of hydrogen, nitrogen and several light hydrocarbons as a function of pressure for composite membranes having Hyflon® AD60 selective layers.

As can be seen in FIG. 2, the hydrogen, nitrogen, and methane fluxes remained nearly constant across the range of pressures. The ethane flux increased from 6.9 GPU at 65 psia to 12.6 GPU at 165 psia, and the propane flux increased from 1.4 GPU at 35 psia to 3.9 GPU at 125 psia, which is about 70% of the saturation vapor pressure (180 psia) of propane at 35° C.

Figure 3:
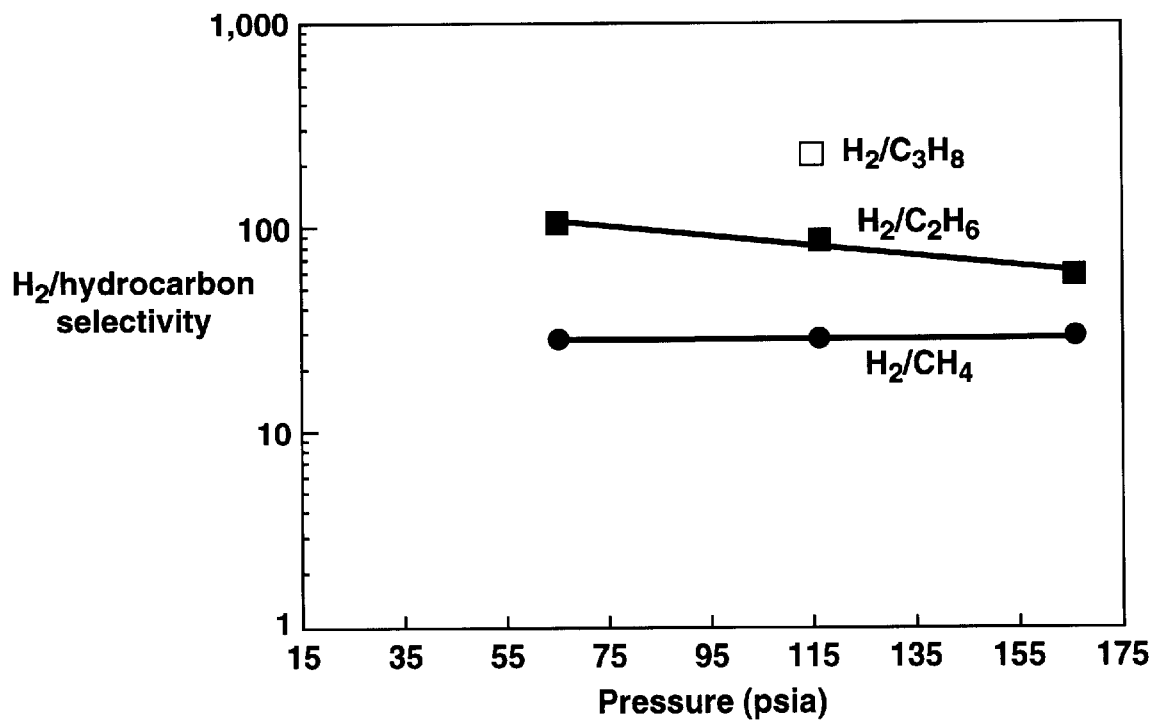
FIG. 3 is a graph of calculated hydrogen/hydrocarbon selectivity based on the pure gas data of FIG. 2.

As shown in FIG. 3, the hydrogen/methane selectivity remained constant at approximately 29 across the range of pressures. The hydrogen/ethane selectivity decreased slightly from 97 at 65 psia to 83 at 115 psia, then decreased further to 57 at 165 psia. The hydrogen/propane selectivity was 230 at 115 psia.

Example 5

Hyflon® AD80 Pure-Gas Permeation Properties

Hyflon® AD80 membranes were prepared as in Example 1, except using a poly(etherimide) support layer. The resulting membranes were tested as in Example 1 with pure hydrogen, nitrogen, methane, ethane, propane, and n-butane at 35° C. at feed pressures ranging from 35 to 165 psia. The n-butane was tested only at 32 psia, which is nearly 70% of the saturation vapor pressure of n-butane at 35° C. The measured pressure-normalized gas fluxes are shown graphically in FIG. 4. The calculated hydrogen/hydrocarbon selectivities are shown graphically in FIG. 5.

Figure 4:
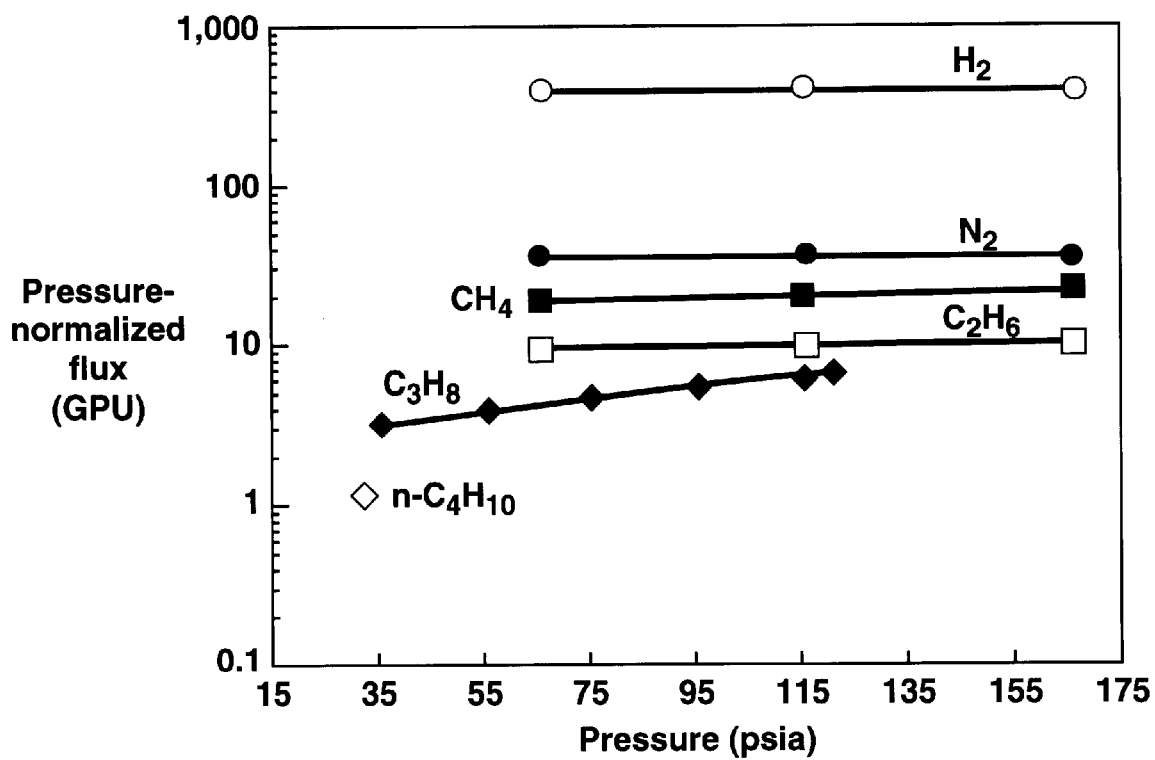
FIG. 4 is a graph of pressure-normalized pure-gas flux of hydrogen, nitrogen and several light hydrocarbons as a function of pressure for composite membranes having Hyflon® AD80 selective layers.
Figure 5:
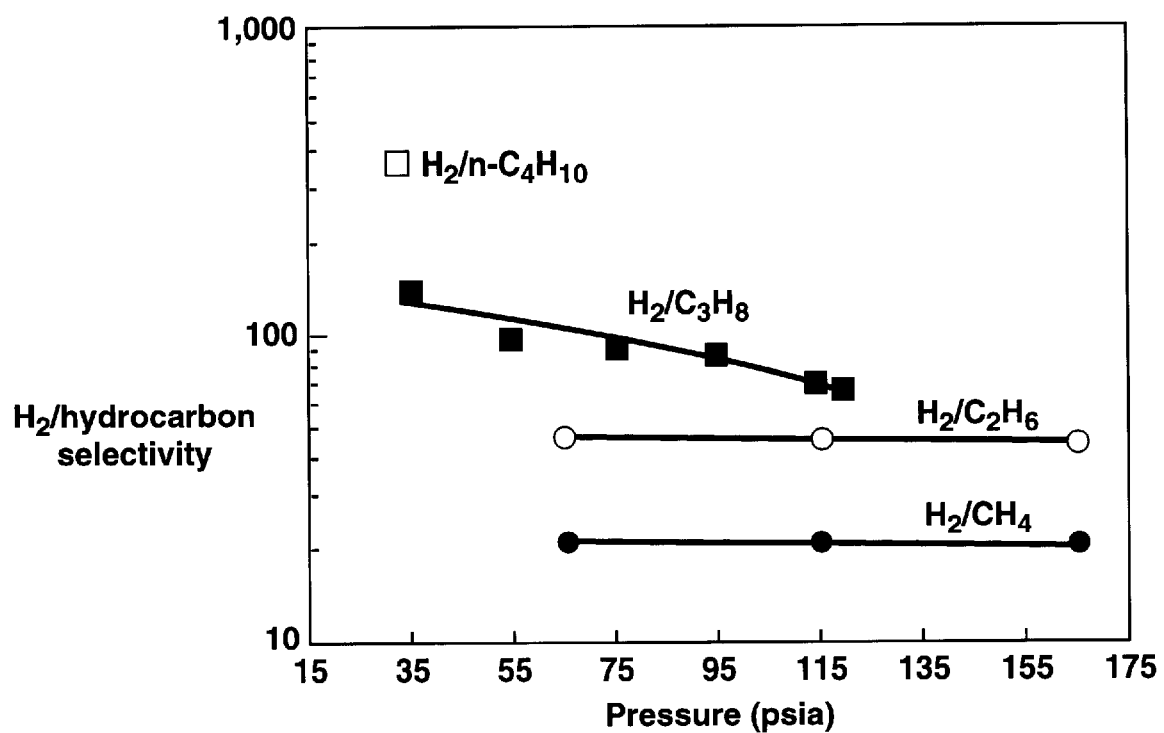
FIG. 5 is a graph of calculated hydrogen/hydrocarbon selectivity based on the pure gas data of FIG. 4.

As can be seen in FIG. 4, the hydrogen, nitrogen, methane and ethane fluxes remained nearly constant across the range of pressures. The propane flux increased from 3 GPU at 35 psia to 6.6 GPU at 120 psia. As shown in FIG. 5, the hydrogen/methane and hydrogen/ethane selectivities remained constant at approximately 20 and 44, respectively, across the range of pressures. The hydrogen/propane selectivity decreased from 140 at 35 psia to 66 at 120 psia. Thus, as in the previous example, the membranes retained useful hydrogen/hydrocarbon selectivity, even at close to hydrocarbon saturation. The hydrogen/n-butane selectivity was 373.

Example 6

Teflon® AF2400 Pure-Gas Permeation Properties—Not in Accordance with the Invention Teflon® AF2400 membranes were prepared as in Example 3, except using a poly(etherimide) support layer. The resulting membranes were tested as in Example 3 with pure hydrogen, nitrogen, methane, ethane, propane, and n-butane at 35° C. at pressures ranging from 17 to 165 psia. The n-butane was tested only up to 31 psia, 31 psia being about 65% of the saturation vapor pressure of n-butane at 35° C. The measured pressure-normalized gas fluxes are shown graphically in FIG. 6. The calculated hydrogen/hydrocarbon selectivities are shown graphically in FIG. 7.

Figure 6:
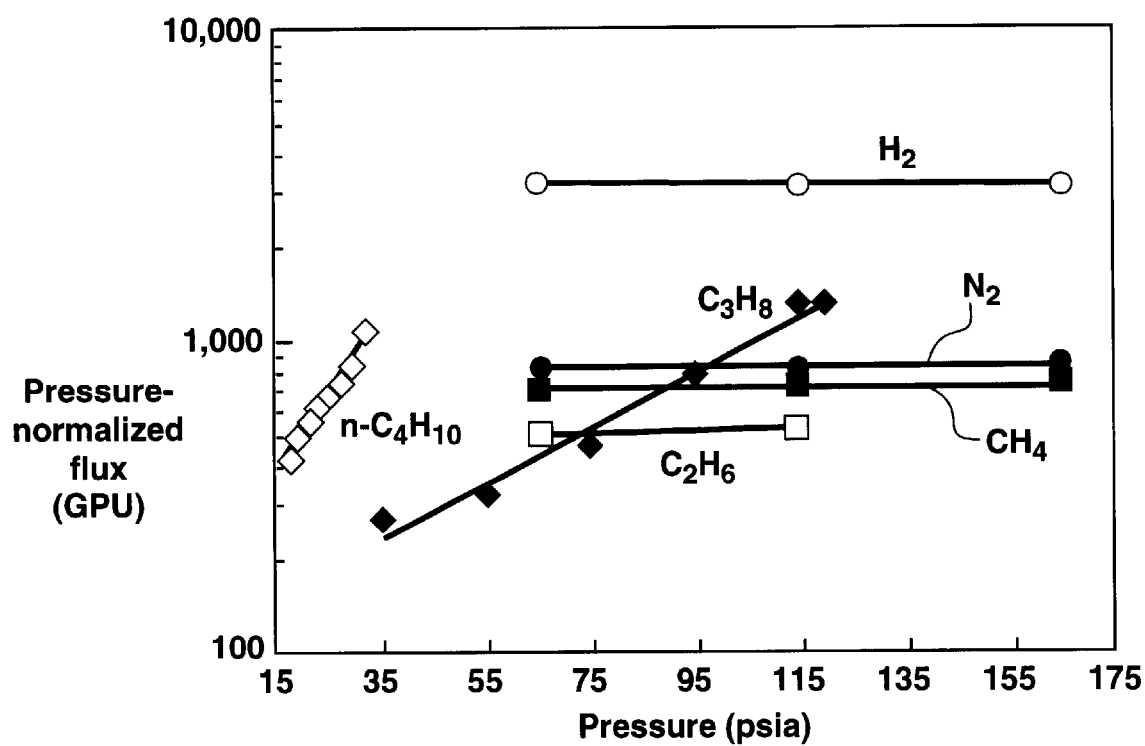
FIG. 6 is a graph of pressure-normalized pure-gas flux of hydrogen, nitrogen and several light hydrocarbons as a function of pressure for composite membranes having Teflon® AF 2400 selective layers.

As can be seen in FIG. 6, the hydrogen, nitrogen, methane, and ethane fluxes remained nearly constant across the range of pressures. The propane flux increased nearly five-fold from 268 GPU at 35 psia to 1,310 GPU at 120 psia, and the n-butane flux increased from 400 GPU at 17 psia to 1,110 GPU at 31 psia.

Figure 7:
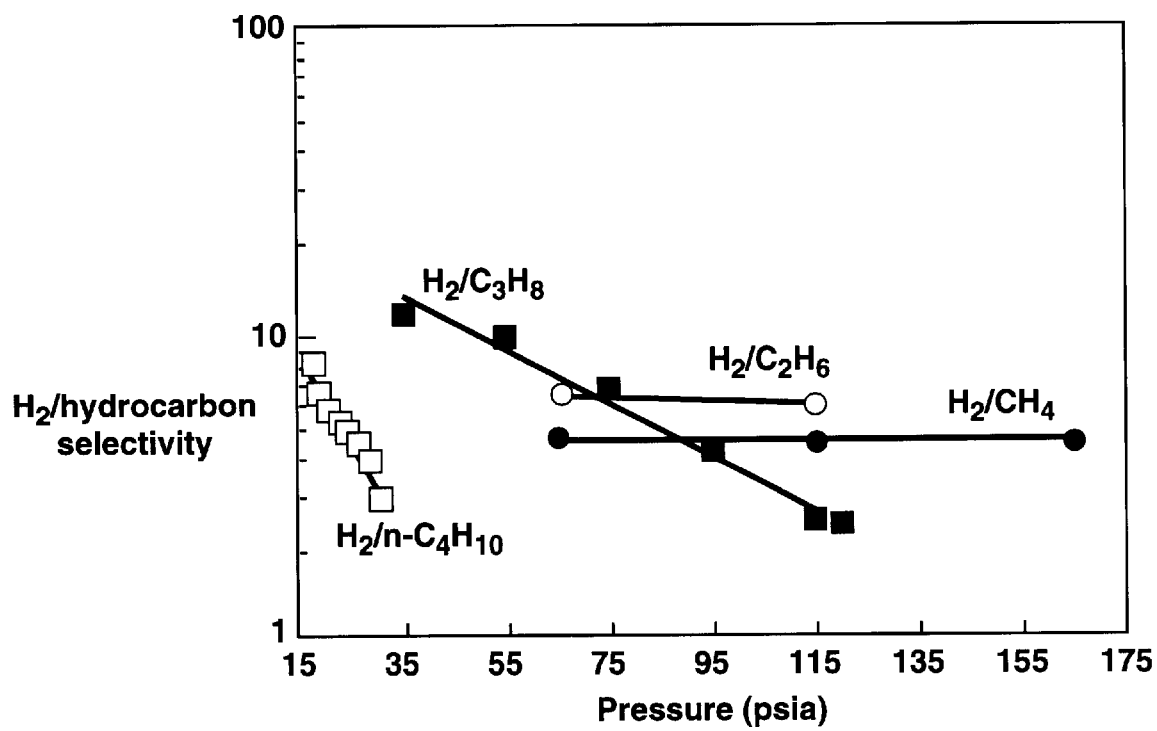
FIG. 7 is a graph of calculated hydrogen/hydrocarbon selectivity based on the pure gas data of FIG. 6.

As shown in FIG. 7, the hydrogen/methane selectivity remained constant at approximately 4.4 across the range of pressures. The hydrogen/ethane selectivity decreased slightly from 6.4 at 65 psia to 5.9 at 115 psia. The hydrogen/propane selectivity decreased from 10.6 at 35 psia to 2.4 at 120 psia, indicating that the Teflon® AF was being plasticized by the propane. The selectivity declined to about 5, less than half its original value, at a pressure of about 75 psia, which is only about 40% of the 180 psia saturation vapor pressure of propane at 35° C. Likewise, the hydrogen/n-butane selectivity decreased from 7.8 at 17 psia to 2.8 at 31 psia, again indicating that the material had plasticized and lost its hydrogen-selective capability in the presence of $C_{3+}$ hydrocarbons.

Example 7

Hyflon® AD60 Multicomponent Mixed-Gas Permeation Properties as a Function of Pressure Hyflon® AD60 membranes were prepared as in Example 4 above and were tested with a gas mixture containing approximately 42% hydrogen, 20% methane, 25% ethane, 11% propane, and 1.4% n-butane at 25° C. at feed pressures ranging from 115 to 415 psia. The saturation vapor pressure of the gas mixture was about 1,130 psia; thus, at 415 psia, the mixture was about 37% saturated.

Figure 8:
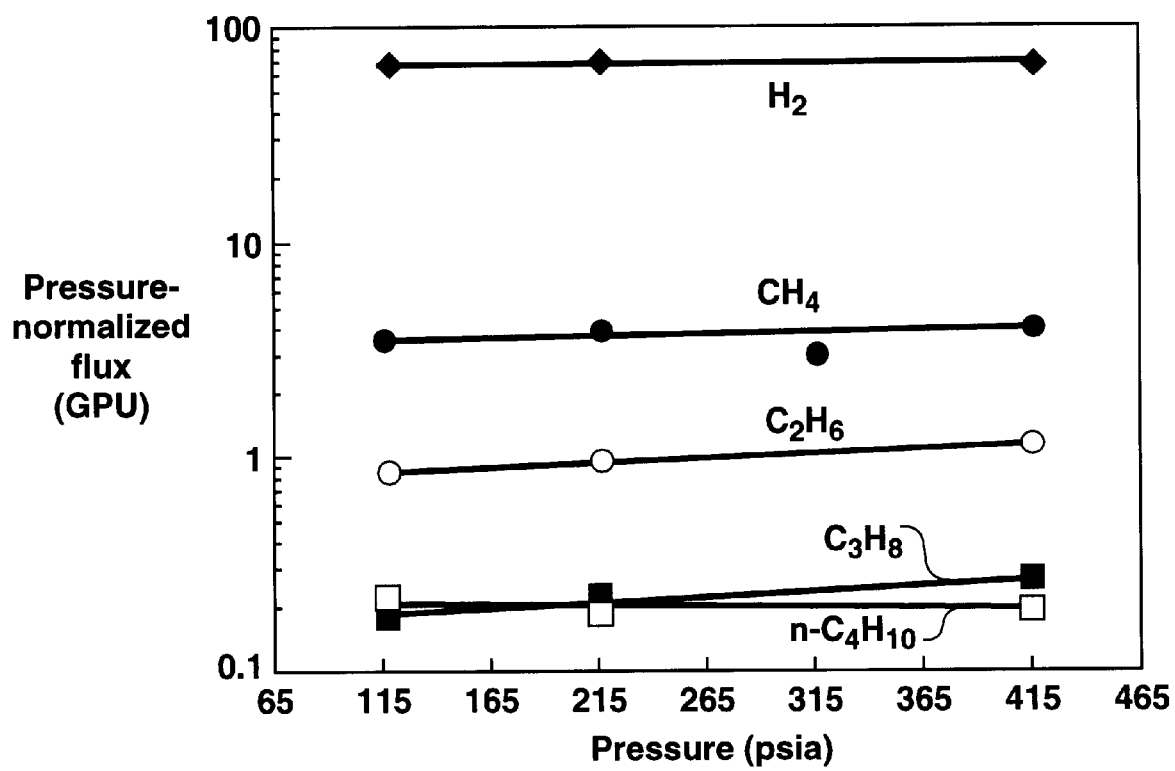
FIG. 8 is a graph of pressure-normalized mixed-gas flux of hydrogen and several light hydrocarbons as a function of pressure for composite membranes having Hyflon® AD 60 selective layers.

The measured pressure-normalized gas fluxes are shown graphically in FIG. 8. The calculated hydrogen/hydrocarbon selectivities are shown graphically in FIG. 9.

Figure 9:
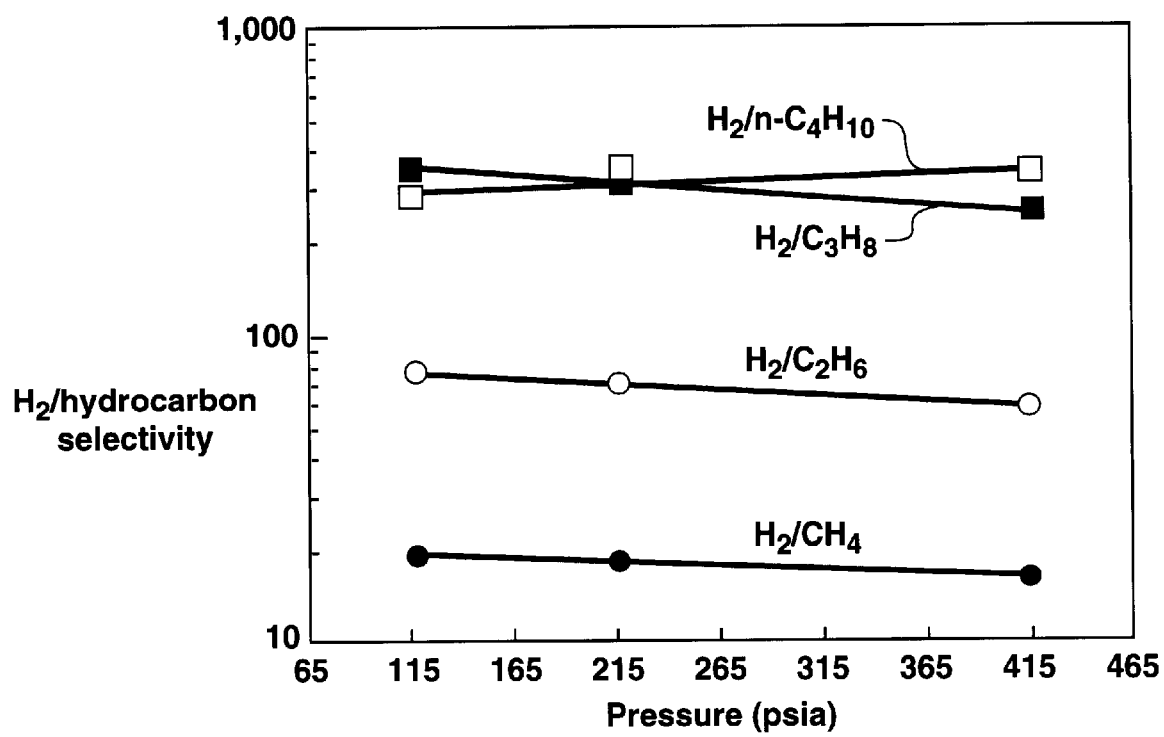
FIG. 9 is a graph of mixed-gas hydrogen/hydrocarbon selectivities based on the mixed gas data of FIG. 8.

As can be seen in FIG. 8, the fluxes of hydrogen, methane, ethane, and propane increased slightly across the range of pressures. The n-butane flux decreased slightly from 0.23 GPU at 115 psia to 0.20 GPU at 415 psia. As shown in FIG. 9, the hydrogen/methane, hydrogen/ethane, and hydrogen/propane selectivities decreased slightly across the range of pressures. The hydrogen/n-butane selectivity appeared to increase from 280 to 328 as the feed pressure increased, but this apparent increase is within the range of experimental error.

Example 8

Hydrogen Recovery Process Design

Figure 10:
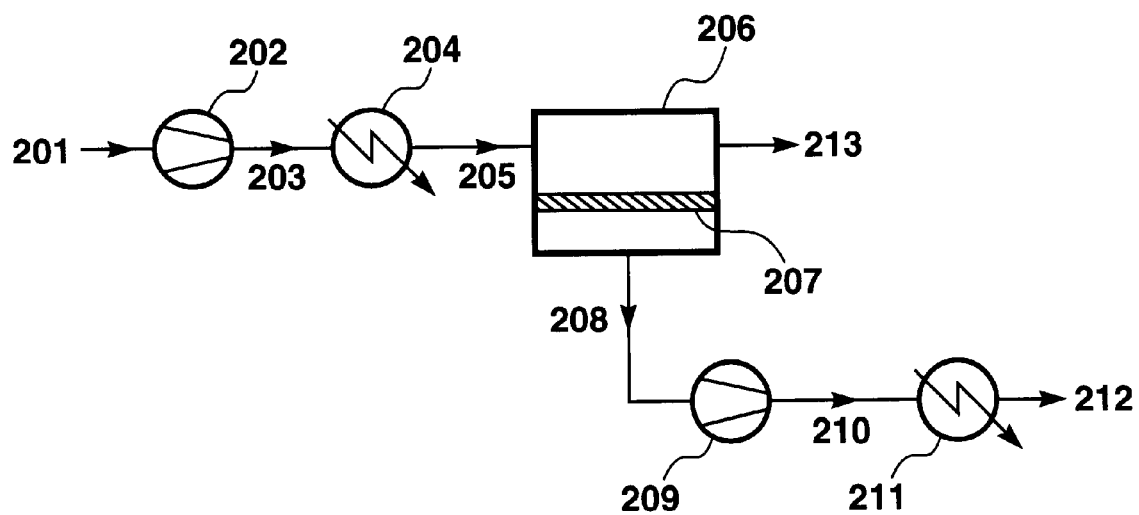
FIG. 10 is a schematic drawing of the process of the invention applied to treatment of refinery off-gas.

A computer calculation was performed with a modeling program, ChemCad V (ChemStations, Inc., Houston, Tex.), to illustrate the process of the invention as reflected in the recovery of hydrogen from refinery off-gas destined for the fuel header. The process was assumed to be carried out as shown in FIG. 10.

Referring to this figure, refinery off-gas stream 201 at 200 psia passes to compressor 202 where it is compressed to 400 psia, stream 203. After passing through the compressor aftercooler, 204, the gas is passed as feed stream 205 to membrane separation unit 206. The membrane separation unit was assumed to contain membranes, 207, providing gas fluxes consistent with the membranes taught in the detailed description of the invention, for example, Hyflon® AD60. The hydrogen-rich permeate stream, 208, is withdrawn from the membrane unit and passes to compressor 209, where it is recompressed to 200 psia, stream 210. After passing through the compressor aftercooler, 211, the hydrogen product stream emerges as stream 212 for use as a hydrogen source in the refinery. Obviously, if the hydrogen were not needed at pressure, the second compressor could be omitted. The residue stream, 213, now at close to its dewpoint, is withdrawn from the feed side of the membrane unit.

The flow rate of the raw off-gas was assumed to be 5 MMscfd, and the gas was assumed to contain 35% hydrogen, 5% nitrogen and 60% $C_1$–$C_6$ hydrocarbons, of which 15% were assumed to be $C_{3+}$ hydrocarbons. The raw gas was assumed to be at 200 psia and 33° C. The permeate side of the membrane was assumed to be at 20 psia. The results of the calculations are summarized in Table 5.

TABLE 5

| Stream | 201 | 205 | 208 | 212 | 213 |
|---|---|---|---|---|---|
| Flow (MMscfd) | 5 | 5 | 1.4 | 1.4 | 3.6 |
| Pressure (psia) | 200 | 400 | 20 | 200 | 400 |
| Temperature (° C.) | 33 | 60 | 60 | 40 | 63 |
| Dewpoint (° C.) | 33 | 49 | −76 | −49 | 58 |
| Component (vol %): | | | | | |
| Hydrogen | 35 | 35 | 90.0 | 90.0 | 13.6 |
| Methane | 30 | 30 | 6.5 | 6.5 | 39.1 |
| Ethane | 15 | 15 | 0.4 | 0.4 | 20.7 |
| Propane | 10 | 10 | 0.2 | 0.2 | 13.8 |
| n-Butane | 3 | 3 | <0.1 | <0.1 | 4.2 |
| n-Hexane | 2 | 2 | <0.1 | <0.1 | 2.8 |
| Nitrogen | 5 | 5 | 2.9 | 2.9 | 5.8 |

As can be seen, the residue stream is reduced in volume from 5 MMscfd to 3.6 MMscfd and in hydrogen content from 35% to 14%, and would be suitable for sending to the fuel header. The process of the invention recovers about 70% of the hydrogen originally in the raw off-gas in reusable form.

We claim:

1. A process for separating hydrogen from a gaseous hydrocarbon in a multicomponent gas mixture comprising hydrogen, the gaseous hydrocarbon, and a third gaseous component, the process comprising the steps of:
   (a) bringing the gas mixture into contact with the feed side of a separation membrane having a feed side and a permeate side, the separation membrane having a selective layer comprising:
      a polymer comprising repeat units of a fluorinated cyclic structure of an at least 5-member ring, the polymer having a fractional free volume no greater than about 0.3;
   (b) providing a driving force for transmembrane permeation;
   (c) withdrawing from the permeate side a permeate stream enriched in hydrogen compared to the gas mixture;
   (d) withdrawing from the feed side a residue stream depleted in hydrogen compared to the gas mixture.

2. The process of claim 1, wherein the gaseous hydrocarbon is chosen from the group consisting of methane, ethane and $C_{3+}$ hydrocarbons.

3. The process of claim 1, wherein the gaseous hydrocarbon is an olefin.

4. The process of claim 1, wherein the gaseous hydrocarbon is an aromatic compound.

5. The process of claim 1, wherein the gaseous hydrocarbon is chosen from the group consisting of halogenated compounds, amines, ketones and alcohols.

6. The process of claim 1, wherein the third gaseous component is a hydrocarbon.

7. The process of claim 1, wherein the third gaseous component is chosen from the group consisting of methane, ethane and $C_{3+}$ hydrocarbons.

8. The process of claim 1, wherein the gas mixture is a refinery gas stream.

9. The process of claim 1, wherein the gas mixture is a petrochemical plant gas stream.

10. The process of claim 1, wherein the polymer comprises a perfluorinated polymer.

11. The process of claim 1, wherein the polymer is formed from a monomer selected from the group consisting of fluorinated dioxoles, fluorinated dioxolanes and fluorinated cyclically polymerizable alkyl ethers.

12. The process of claim 1, wherein the polymer is formed from a perfluorinated polyimide.

13. The process of claim 1, wherein the repeat unit is 2,2,4-trifluoro-5-trifluoromethoxy-1,3-dioxole.

14. The process of claim 1, wherein the polymer is a polyperfluoro (alkenyl vinyl ether).

15. The process of claim 1, wherein the polymer comprises a copolymer.

16. The process of claim 1, wherein the polymer comprises a copolymer having repeat units as recited in claim 1 copolymerized with repeat units of a second fluorinated monomer.

17. The process of claim 1, wherein the polymer comprises a copolymer having repeat units as recited in claim 1 copolymerized with repeat units of tetrafluoroethylene.

18. The process of claim 1, wherein the polymer has the formula:

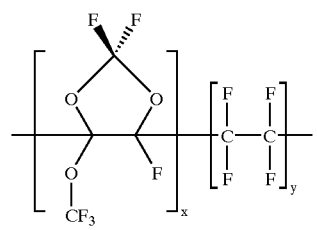

where x and y represent the relative proportions of the dioxole and the tetrafluoroethylene blocks, such that x+y=1.

19. The process of claim 1, wherein the polymer has the formula:

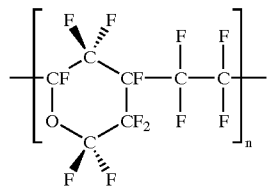

where n is a positive integer.

20. The process of claim 1, wherein the separation membrane is a composite membrane comprising the selective layer supported on a microporous support membrane.

21. The process of claim 1, wherein the gas mixture, as brought into contact with the feed side, has a total $C_{3+}$ hydrocarbons partial pressure of at least about 25 psia.

22. The process of claim 1, wherein the separation membrane provides a pressure-normalized hydrogen flux as measured with pure gas at 25° C. of at least about 50 GPU.

23. The process of claim 1, further comprising passing the permeate stream to additional separation treatment.

24. The process of claim 1, further comprising passing the residue stream to additional separation treatment.

25. The process of claim 1, wherein the separation membrane exhibits a mixed-gas selectivity for hydrogen over methane as measured at the operating conditions of the process of at least about 10.

26. The process of claim 1, further comprising passing the residue stream to a fuel gas supply.

27. The process of claim 1, further comprising passing the permeate stream to a pressure swing adsorption unit to produce a high-purity hydrogen stream.

28. The process of claim 1, wherein the gas mixture comprises tail gas from a pressure swing adsorption unit.

29. The process of claim 1, wherein the gas mixture comprises a process or off-gas stream from a hydroprocessor.

30. The process of claim 1, wherein the gas mixture comprises a process or off-gas stream from a catalytic reformer.

31. The process of claim 1, wherein the gas mixture comprises a process or off-gas stream from a fluid catalytic cracker.

32. The process of claim 1, wherein the gas mixture comprises a process or off-gas stream from a stream cracker.

33. The process of claim 1, wherein the gas mixture comprises a process or off-gas stream from a steam reformer.

34. The process of claim 1, further comprising removing a contaminant material that has been brought into a module housing the separation membrane during operation of steps (a) through (d) by:
  (e) discontinuing steps (a) through (d); and
  (f) flushing the module with an organic solvent.

35. A process for separating hydrogen from a gaseous hydrocarbon in a multicomponent gas mixture comprising hydrogen, the gaseous hydrocarbon, and a third gaseous component, the process comprising the steps of:
  (a) bringing the gas mixture into contact with the feed side of a separation membrane having a feed side and a permeate side, the membrane having a selective layer comprising a polymer having:
    (i) a ratio of fluorine to carbon atoms in the polymer greater than 1:1;
    (ii) a fractional free volume no greater than about 0.3; and
    (iii) a glass transition temperature of at least about 100° C.;
  and the separation membrane being characterized by a post-exposure selectivity for hydrogen over the gaseous hydrocarbon, after exposure of the separation membrane to liquid toluene and subsequent drying, that is at least about 65% of a pre-exposure selectivity for hydrogen over the gaseous hydrocarbon, as measured pre- and post-exposure with a test gas mixture of the same composition and under like conditions;
  (b) providing a driving force for transmembrane permeation;
  (c) withdrawing from the permeate side a permeate stream enriched in hydrogen compared to the gas mixture;
  (d) withdrawing from the feed side a residue stream depleted in hydrogen compared to the gas mixture.

36. The process of claim 35, wherein the gaseous hydrocarbon is chosen from the group consisting of methane, ethane and $C_{3+}$ hydrocarbons.

37. The process of claim 35, wherein the gaseous hydrocarbon is an olefin.

38. The process of claim 35, wherein the gaseous hydrocarbon is an aromatic compound.

39. The process of claim 35, wherein the gaseous hydrocarbon is chosen from the group consisting of halogenated compounds, amines, ketones and alcohols.

40. The process of claim 35, wherein the third gaseous component is a hydrocarbon.

41. The process of claim 35, wherein the third gaseous component is chosen from the group consisting of methane, ethane and $C_{3+}$ hydrocarbons.

42. The process of claim 35, wherein the gas mixture is a refinery gas stream.

43. The process of claim 35, wherein the gas mixture is a petrochemical plant gas stream.

44. The process of claim 35, wherein the selective layer comprises a perfluorinated polymer.

45. The process of claim 35, wherein the selective layer comprises a polymer formed from a monomer selected from the group consisting of fluorinated dioxoles, fluorinated dioxolanes and fluorinated cyclically polymerizable alkyl ethers.

46. The process of claim 35, wherein the selective layer comprises a perfluorinated polyimide.

47. The process of claim 35, wherein the selective layer comprises a copolymer.

48. The process of claim 35, wherein the selective layer comprises a copolymer formed from fluorinated dioxole and tetrafluoroethylene repeat units.

49. The process of claim 35, wherein the selective layer comprises a polymer having the formula:

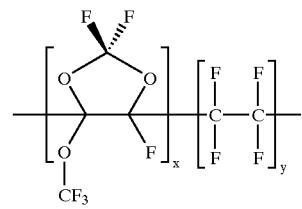

where x and y represent the relative proportions of the dioxole and the tetrafluoroethylene blocks, such that x+y=1.

50. The process of claim 35, wherein the selective layer comprises a polymer having the formula:

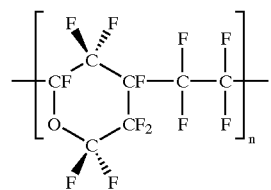

where n is a positive integer.

51. The process of claim 35, wherein the separation membrane is a composite membrane comprising the selective layer supported on a microporous support membrane.

52. The process of claim 35, wherein the gas mixture, as brought into contact with the feed side, has a total $C_{3+}$ hydrocarbons partial pressure of at least about 25 psia.

53. The process of claim 35, wherein the separation membrane provides a pressure-normalized hydrogen flux as measured with pure gas at 25° C. of at least about 50 GPU.

54. The process of claim 35, further comprising passing the permeate stream to additional separation treatment.

55. The process of claim 35, further comprising passing the residue stream to additional separation treatment.

56. The process of claim 35, wherein the separation membrane exhibits a mixed-gas selectivity for hydrogen over methane as measured at the operating conditions of the process of at least about 10.

57. The process of claim 35, further comprising passing the residue stream to a fuel gas supply.

58. The process of claim 35, further comprising passing the permeate stream to a pressure swing adsorption unit to produce a high-purity hydrogen stream.

59. The process of claim 35, wherein the gas mixture comprises tail gas from a pressure swing adsorption unit.

60. The process of claim 35, wherein the gas mixture comprises a process or off-gas stream from a hydroprocessor.

61. The process of claim 35, wherein the gas mixture comprises a process or off-gas stream from a catalytic reformer.

62. The process of claim 35, wherein the gas mixture comprises a process or off-gas stream from a fluid catalytic cracker.

63. The process of claim 35, wherein the gas mixture comprises a process or off-gas stream from a stream cracker.

64. The process of claim 35, wherein the gas mixture comprises a process or off-gas stream from a steam reformer.

65. The process of claim 35, further comprising removing a contaminant material that has been brought into a module housing the separation membrane during operation of steps (a) through (d) by:

(e) discontinuing steps (a) through (d); and (f) flushing the module with an organic solvent.

* * * * *

UNITED STATES PATENT AND TRADEMARK OFFICE
CERTIFICATE OF CORRECTION

PATENT NO.   : 6,544,316 B2
DATED        : April 8, 2003
INVENTOR(S)  : Richard W. Baker et al.

It is certified that error appears in the above-identified patent and that said Letters Patent is hereby corrected as shown below:

Column 1,
Line 4, please insert: -- This invention was made with in part with Government support under award number DE-FG03-00ER83046, awarded by the Department of Energy. The Government has certain rights in this invention. --

Signed and Sealed this

Twenty-second Day of July, 2003

JAMES E. ROGAN
*Director of the United States Patent and Trademark Office*